United States Patent [19]

Minamitani et al.

[11] Patent Number: 5,708,676
[45] Date of Patent: Jan. 13, 1998

[54] DISCHARGE EXCITATION TYPE PULSE LASER APPARATUS

[75] Inventors: Yasushi Minamitani; Hajime Nakatani, both of Tokyo, Japan

[73] Assignee: Mitsubishi Denki Kabushiki Kaisha, Tokyo, Japan

[21] Appl. No.: 543,987

[22] Filed: Oct. 17, 1995

[30] Foreign Application Priority Data

Nov. 4, 1994 [JP] Japan ................................ 6-271210

[51] Int. Cl.$^6$ ............................................. H01S 3/097
[52] U.S. Cl. ............................................. 372/86
[58] Field of Search ........................... 372/38, 86

[56] References Cited

U.S. PATENT DOCUMENTS

| | | | |
|---|---|---|---|
| 5,090,021 | 2/1992 | Nakatani et al. | 372/86 |
| 5,181,217 | 1/1993 | Sato et al. | 372/86 |

FOREIGN PATENT DOCUMENTS

| | | |
|---|---|---|
| 62-282475 | 12/1987 | Japan . |
| 63-197390 | 8/1988 | Japan . |
| 63-304682 | 12/1988 | Japan . |
| 4-133378 | 5/1992 | Japan . |
| 5-218547 | 8/1993 | Japan . |
| 5 283777 | 10/1993 | Japan . |
| 5-327088 | 12/1993 | Japan . |

OTHER PUBLICATIONS

S.V. Melchenko, et al. "High–Power Raman Conversion of a Discharge XeCl–Laser." Optics Communications, vol. 56, No. 1; Nov. 1, 1985; pp. 51–52.

"Magnetic Pulse Compression for Excimer Lasers." Questek, Technical Note No. 2, May 1983.

Primary Examiner—Rodney B. Bovernick
Assistant Examiner—Robert E. Wise
Attorney, Agent, or Firm—Oblon, Spivak, McClelland, Maier & Neustadt, P.C.

[57] ABSTRACT

A discharge excitation type pulse laser apparatus includes main discharge electrodes and and an auxiliary discharge electrode. In order to make a voltage pulse applied to the auxiliary discharge electrode rise up steeply without incurring any appreciable time lag, a reactor connected in series to a first charging capacitor is constituted by a first saturable reactor 19 with a second saturable reactor being additionally inserted in series to a second charging capacitor. After stray inductance and resistance components of a switch become minimum, inductance of the saturable reactor is first decreased, which is then followed by decreasing of inductance of the first saturable reactor. Degree of steepness of the voltage rise-up for corona and main discharges can set at high values, respectively, whereby preionization is accelerated to allow the main discharge to occur uniformly. The energy injected into the main discharge is increased. Laser output power and oscillation efficiency are enhanced.

12 Claims, 11 Drawing Sheets

DISCHARGE EXCITATION TYPE PULSE LASER APPARATUS

BACKGROUND OF THE INVENTION

1. Field of the Invention

The present invention generally relates to an discharge excitation type pulse laser apparatus such as an excimer laser apparatus and the like. More particularly, the invention is concerned with a pulse generating circuit destined for use in such discharge excitation type pulse laser apparatus.

2. Description of Related Art

For a full understanding of the present invention, the background or related techniques thereof will first be reviewed in some detail. FIG. 17 is a circuit diagram showing a pulse generating circuit for a conventional excimer laser apparatus known heretofore such as disclosed, for example, in "OPTICS COMMUNICATIONS", Vol. 56, No. 1, p. 51 (Nov. 1, 1985).

Referring to this figure, accommodated within a laser chamber 1 which is hermetically filled with a laser gas such as, for example, XeCl gas are a first main discharge electrode 2 having a protruding curvilinear discharge surface, a second main discharge electrode 3 which is disposed in opposition to the first main discharge electrode 2 and formed of a metal mesh so as to present a curvilinear surface protruding toward the electrode 2, and an auxiliary discharge electrode (serving as a preionization electrode) 4 disposed at the rear side of the second main discharge electrode 3 as viewed from the first main discharge electrode 2. The auxiliary discharge electrode 4 has a rear surface coated with an insulation member 5.

A charging terminal 6 is connected to one of the electrodes of a switching device 8 constituted, for example, by a spark gap switch by way of a charging resistor 7, wherein the other electrode of the switching device 8 is connected to the second main discharge electrode 3 and to the ground potential.

Further, first charging capacitors 9a and 9b are connected in series to associated reactors 10a and 10b, respectively, and inserted between aforementioned the other electrode of the switching device 8 and the first main discharge electrode 2, wherein the series connection of the first charging capacitor 9a and the reactor 10a is connected in parallel with the series connection of the first charging capacitor 9b and the reactor 10b. On the other hand, second charging capacitors 11a and 11b are connected between the second main discharge electrode 3 and the junctions forward between the first charging capacitors 9a and 9b and the reactors 10a and 10b, respectively. Additionally, a second charging capacitor 12 is connected between the other electrode of the switching device 8 and the auxiliary discharge electrode 4, while peaking capacitor 13 is connected between the first and second main discharge electrodes 2 and 3. Furthermore, a resistor 14 serving as a first charging circuit element is connected in parallel to the peaking capacitor 13 between the first and second main discharge electrodes 2 and 3. Moreover, a resistor 15 serving as a second charging circuit element is inserted between the second main discharge electrode 3 and the auxiliary discharge electrode 4. The resistors 14 and 15 cooperate to constitute a charging circuit.

Now, referring to a waveform diagram of FIGS. 18 and 19, description will be directed to operation of the pulse generating circuit for the excimer laser apparatus of the structure mentioned above. At first, a DC voltage is applied to the charging terminal 6 from a power supply source (not shown) for thereby charging the capacitors 9a, 9b 11a, 11b and 12 by way of the charging resistor 7. Because the resistors 14 and 15 are inserted between the first and second charging electrodes 2 and 3, each of the capacitors 9a, 9b, 11a, 11b and 12 mentioned above is applied with a sufficiently high voltage for charging fully these capacitors.

At this juncture, it is to be noted that the spark gap switching device 8, the reactors 10a and 10b and the capacitors 9a, 9b, 11a and 11b cooperate to constitute an LC-invertor circuit well known heretofore in the art. Accordingly, when discharge takes place in the spark gap of the switching device 8 upon completion of the charging of the capacitors 9a, 9b, 11a and 11b, the voltages appearing across the capacitors 9a, 9b, 11a and 11b are mutually superposed, as indicated by a waveform 1 in FIG. 18, as a result of which a high pulse-like voltage is applied between the first and second main discharge electrodes 2 and 3. Furthermore, simultaneously with the closing of the switching device 8, the second charging capacitor 12 is also discharged. As a result of this, a pulse-like voltage of a waveform such as indicated by a waveform 2 in FIG. 18 is applied across the second main discharge electrode 3 and the auxiliary discharge electrode 4.

In response to generation of the pulse-like voltages mentioned above, a corona discharge 16 first takes place between the second main discharge electrode 3 and the auxiliary discharge electrode 4. As a result of this, a space defined between both the first and second main discharge electrodes 2 and 3 is irradiated with ultraviolet rays originating in the corona discharge 16 through the second main discharge electrode 3 of the mesh structure, whereby of the aforementioned inter-electrode space preionization is effectuated. Parenthetically, the insulation member 5 serves to prevent the corona discharge 16 from making transition to an arc discharge.

As the peak value of the pulse-like voltage applied across the first and second main discharge electrodes 2 and 3 increases, ionization by collision due to electrons generated by the preionization takes place in the inter-electrode space mentioned above. As a result of this, a main discharge 17 now occurs between the first and second main discharge electrodes 2 and 3, which triggers the laser oscillation. In this conjunction, the peaking capacitor 13 functions to increase the peak value of the voltage applied between both the first and second main discharge electrodes 2 and 3 due to a so-called capacitive transition.

As is known in the art, when the pulse-like voltage applied between the second main discharge electrode 3 and the auxiliary discharge electrode 4 rises up at a high rate, the preionization due to the corona discharge 16 is promoted, whereby uniformity of the main discharge 17 is enhanced, which contributes to increasing the laser output power. For more particulars in this respect, reference may be made to, for example, "J. Appln. Phys.", 54(10), (October, 1983), pp. 5672–5675. In this conjunction, it is to be noted that the size-up rate of the pulse-like voltage in the circuitry for the auxiliary discharge electrode 4 exhibits a significant dependency on the stray inductance component and resistance component. More specifically, a proportion of the current flowing through the circuitry for the main discharge 17 may flow into the stray inductance components and resistance components existing at the ends of the switching device 8 among others, incurring a voltage drop which will involve a delay in the voltage rise-up in the circuitry for the corona discharge 16.

Accordingly, when the current of the circuitry for the main discharge 17 is suppressed by increasing the capacities of the reactors 10a and 10b, the voltage rise-up in the circuitry for the corona discharge 16 is accompanied with a corresponding time lag (refer to a waveform 2 shown in FIG. 18).

As is apparent from the foregoing, with the structure of the conventional discharge excitation type pulse laser apparatus described above, when the capacities of the reactors 10a and 10b are increased in an effort to promote the preionization under the influence of the corona discharge, the rise-up of the voltage pulse in the circuitry for the main discharge 17 is accompanied with a time lag or delay, as can be seen from the waveform 1 shown in FIG. 18. As a consequence, a main discharge start voltage (firing potential) $V_B$ which is determined by the main discharge voltage (V)-versus-time (t) characteristic becomes lower, which in turn incurs corresponding decrease of the injection energy, rendering it difficult or impossible to increase the laser output power.

SUMMARY OF THE INVENTION

In the light of the state of the art described above, it is an object of the present invention to provide a discharge excitation type pulse laser apparatus whose output power can be increased by promoting the rise-up of the voltage applied across the auxiliary discharge electrode and the second main discharge electrode without lowering the discharge start voltage (firing potential) between both the main discharge electrodes.

In view of the above and other objects which will become more apparent as the description proceeds, there is provided according to a first aspect of the present invention a discharge excitation type pulse laser apparatus which includes a pair of first and second main discharge electrodes disposed in opposition to each other for generating a main discharge therebetween, an auxiliary discharge electrode disposed in the vicinity of the second main discharge electrode for generating a corona discharge between the second main discharge electrode and the auxiliary discharge electrode, a first pulse generating circuit connected to the first and second main discharge electrodes for applying a pulse-like voltage for generating the main discharge between the first and second main discharge electrodes, a second pulse generating circuit connected to the second main discharge electrode and the auxiliary discharge electrode for applying a pulse-like voltage for generating the corona discharge between the second main discharge electrode and the auxiliary discharge electrode, a switching device for controlling application and interruption of the voltage applied to the first and second main discharge electrodes from the first pulse generating circuit and the voltage applied to the second main discharge electrode and the auxiliary discharge electrode from the second pulse generating circuit, a first saturable reactor connected between the switching device and the first pulse generating circuit, and a second saturable reactor connected between the switching device and the second pulse generating circuit.

In the discharge excitation type pulse laser apparatus of the structure described above, the switch means is closed to a fully conducting state during a period in which the first saturable reactor inserted between the switching device and the first pulse generating circuit interrupts output of the first pulse generating circuit while the second saturable reactor inserted between the switching device and the first pulse generating circuit interrupts the output of the second pulse generating circuit. As a result of this, the stray inductance and resistance components existing at terminals and other parts of the switching device decrease to minimum. Subsequently, the second saturable reactor becomes magnetically saturated with the inductance thereof steeply decreasing nonlinearly to thereby allow the voltage outputted from the second pulse generating circuit to rise up. At this time point, the inductance of the first saturable reactor continues to remain at a large value in the state in which the stray inductance and resistance components of the switching device are at minimum. Consequently, the pulse-like voltage outputted from the second pulse generating circuit can rise up steeply. Thereafter, the first saturable reactor is magnetically saturated with the inductance thereof decreasing nonlinearly to thereby allow the pulse-like voltage outputted from the first pulse generating circuit to rise up. Thus, the steepness of the voltage rise-up for both the corona discharge and the main discharge can assume large values, respectively, whereby the preionization is accelerated to make the main discharge more uniform. The energy injection to the main discharge can increase as well. As the overall effect, the laser output power as well as the laser oscillation efficiency can significantly be improved or enhanced.

According to a second aspect of the present invention, there is provided a discharge excitation type pulse laser apparatus which includes a pair of first and second main discharge electrodes disposed in opposition to each other for generating a main discharge therebetween, an auxiliary discharge electrode disposed in the vicinity of the second main discharge electrode for generating a corona discharge between the second main discharge electrode and the auxiliary discharge electrode, a first pulse generating circuit connected to the first and second main discharge electrodes for applying a pulse-like voltage for generating the main discharge between the first and second main discharge electrodes, a second pulse generating circuit connected to the second main discharge electrode and the auxiliary discharge electrode for applying a pulse-like voltage for generating the corona discharge between the second main discharge electrode and the auxiliary discharge electrode, a switching device for controlling application and interruption of the voltage applied to the first and second main discharge electrodes from the first pulse generating circuit and the voltage applied to the second main discharge electrode and the auxiliary discharge electrode from the second pulse generating circuit, and a saturable transformer inserted between the switching device and the first and second pulse generating circuits and having a primary winding connected between the switching device and the first pulse generating circuit and a secondary winding connected to the second pulse generating circuit.

In the discharge excitation type pulse laser apparatus of the structure described above, the saturable transformer inserted between the switching device and the first pulse generating circuit turns off the first pulse generating circuit upon closing of the switching device to thereby allow the second pulse generating circuit to generate a pulse-like voltage which rises up steeply. When the switching device assumes the fully conducting state, the stray inductance and resistance components existing at the terminal electrodes and other parts of the switching device decrease to minimum. In succession, the saturable transformer becomes magnetically saturated with the inductance lowering nonlinearly, as a result of which the pulse-like voltage of the first pulse generating circuit can rise up steeply. Thus, the steepness of the voltage rise-up for both the corona discharge and the main discharge can assume large values, respectively, whereby the preionization is accelerated to make the main discharge more uniform. The energy injection to the main discharge can increase as well. The laser output power as well as the laser oscillation efficiency can significantly be enhanced and improved.

In a preferred mode for carrying out the present invention, the first pulse generating circuit may include a first charging capacitor for the main discharge which is connected in series to and between the first main discharge electrode and the first saturable reactor, and a parallel connection of a first charging circuit element and a peaking capacitor connected between the first main discharge electrode and the second main discharge electrode. The second pulse generating circuit includes a second charging capacitor connected between the auxiliary discharge electrode and the second saturable reactor. Further, a second charging circuit element is inserted between the second main discharge electrode and the auxiliary discharge electrode. The first and second charging capacitors are first charged in an opened state of the switching device, which is then followed by closing of the switching device for decreasing inductance of the second saturable reactor to thereby allow a voltage applied across the auxiliary discharge electrode and the second main discharge electrode to rise up for causing a corona discharge to take place between the auxiliary discharge electrode and the second main discharge electrode for thereby bringing about preionization in a space existing between the first main discharge electrode and the second main discharge electrode. Subsequently, the switching device is closed fully to allow the inductance of the first saturable reactor to decrease so that a main discharge can take place between the first main discharge electrode and the second main discharge electrode.

With the arrangement described above, when the switching device is closed after charging of the first and second charging capacitors in the state in which the switching device is opened, inductance of the second saturable reactor decreases at first to cause a voltage appearing across the auxiliary discharge electrode and the second main discharge electrode to rise up for thereby bringing about the corona discharge for preionization of a space existing between the first main discharge electrode and the second main discharge electrode. Subsequently, when the switching device is fully closed (fully conducting), the inductance of the first saturable reactor decreases to cause the main discharge to occur between the first main discharge electrode and the second main discharge electrode. Thus, the steepness of the voltage rise-up for both the corona discharge and the main discharge can assume large values, respectively, so that the preionization can be accelerated to make the main discharge more uniform. The energy injection to the main discharge can increase as well. As the overall effect, the laser output power as well as the laser oscillation efficiency can significantly be improved or enhanced.

In another preferred mode for carrying out the present invention, the second pulse generating circuit may include a second charging capacitor inserted in series between the second saturable reactor and the auxiliary discharge electrode, a third saturable reactor connected between the auxiliary discharge electrode and a series connection of the second saturable reactor and the second charging capacitor, a third charging circuit element inserted between the auxiliary discharge electrode and the second main discharge electrode, and a parallel connection of a first charge transfer capacitor and a second charging circuit element, the first charge transfer capacitor having one end connected to a junction between the series connection of the second saturable reactor and the second charging capacitor and the third saturable reactor, the other end of the first charge transfer capacitor being connected to the second main discharge electrode.

By virtue of the arrangement of the discharge excitation type pulse laser apparatus described above, the first and second saturable reactors have initially high inductances, respectively, so that the circuit operation is inhibited until the switching device assumes the fully conducting state so that the stray inductance and resistance components existing at the terminals and other parts of the switching device become minimum. Thereafter, the second saturable reactor is magnetically saturated with the inductance thereof decreasing nonlinearly to allow the electric charge to be transferred to the first charge transfer capacitor. At this time point, inductance of the first saturable reactor continues to remain at a large value with the stray inductance and resistance components of the switching device being at minimum. Thus, the pulse-like voltage of the first charge transfer capacitor rises up steeply. Thereafter, the first saturable reactor is magnetically saturated with the inductance thereof lowering nonlinearly. Consequently, the rise-up of the voltage between the first main discharge electrode and second main discharge electrode will scarcely accompanied with any appreciable time delay. Simultaneously, the third saturable reactor is magnetically fully saturated with the inductance thereof lowering nonlinearly, whereby the voltage of the first charge transfer capacitor is applied to the auxiliary discharge electrode. Since the loop of this circuitry has a lower inductance than that of a loop constituted by the switching device, the second charging capacitor, the second saturable reactor and the first charge transfer capacitor, the voltage applied to the auxiliary discharge electrode rises up steeply, whereby the rise-up of the pulse-like voltage appearing across the auxiliary discharge electrode and the second main discharge electrode becomes more steeply.

In yet another preferred mode for carrying out the present invention, a plurality of saturable reactors may be connected in series between the third saturable reactor and the auxiliary discharge electrode. The same number of charge transfer capacitors as the plurality of saturable reactors may be connected between the second main discharge electrode and a junction of the third saturable reactor and one of the plurality of saturable reactors and junctions of the plurality of saturable reactors, respectively.

By virtue of the arrangement of the discharge excitation type pulse laser apparatus described above, the first and second saturable reactors exhibit initially high inductances, respectively, so that the circuit operation is inhibited until the switching device assumes the fully conducting state in which the stray inductance and resistance components existing at the terminals of the switching device become minimum. Thereafter, the second saturable reactor is magnetically saturated with the inductance thereof decreasing nonlinearly to thereby allow the electric charge to be transferred to the first charge transfer capacitor. At this time point, however, the inductance of the first saturable reactor continues to remain at a large value with the stray inductance and resistance components of the switching device being at minimum. Thus, the pulse-like voltage of the first charge transfer capacitor rises up steeply. Thereafter, the first saturable reactor is magnetically saturated with the capacitive inductance thereof lowering nonlinearly. Consequently, the rise-up of the voltage between the first main discharge electrode and the second main discharge electrode will scarcely be accompanied with any appreciable time delay.

Furthermore, the third saturable reactor is magnetically fully saturated with the inductance thereof steeply lowering nonlinearly, as a result of which the electric electrode charge of the first charge transfer capacitor is transferred to the second charge transfer capacitor. Since the loop of this circuitry has a lower inductance than that of a loop constituted by the switching device, the second charging capacitor, the second saturable reactor and the first charge transfer capacitor, the charge transfer to the second charge transfer capacitor is performed at a high rate, which results in a more steep rise-up of the pulse-like voltage. Since the operation mentioned above is performed sequentially by a plurality of saturable reactors and a corresponding number of charge transfer capacitors, the steepness of voltage rise-up is further increased, whereby the timing at which the pulse-like voltage rises up between the auxiliary discharge electrode and the second main discharge electrode can be made to coincide substantially with the timing at which the pulse-like voltage rises up between the first and second main discharge electrodes. Thus, before the amount of electrons generated by the preionization under the corona discharge decreases to any appreciable extent, the voltage between the first and second main discharge electrodes can rise up. In this manner, the effect of the preionization can be made use of more effectively and advantageously.

In still another preferred mode for carrying out the present invention, the first pulse generating circuit may include a first charging capacitor connected in series between the first main discharge electrode and a primary winding of the saturable transformer and a parallel connection of a first charging circuit element and a peaking capacitor connected between the first main discharge electrode and the second main discharge electrode. The second pulse generating circuit includes a connecting conductor inserted between the auxiliary discharge electrode and the saturable transformer. After charging the first charging capacitor in an opened state of the switching device, the switching device is closed to allow a corona discharge to take place at first between the auxiliary discharge electrode and the second main discharge electrode for thereby bringing about preionization in a space existing between the first and second main discharge electrodes. Thereafter, the switching device is closed fully to allow the inductance of the saturable transformer to decrease so that a main discharge can take place between the first and second main discharge electrodes.

With the arrangement of the discharge excitation type pulse laser apparatus described above, the saturable transformer exhibits a high inductance value in the initial state. After the switching device is closed, a voltage rising up steeply is induced in the secondary winding of the saturable transformer in correspondence to the operation of the switching device. At this time point, however, the saturable transformer is still in the unsaturated state, exhibiting a large inductance value. Consequently, after the rise-up of the pulse-like voltage, the saturable transformer is magnetically saturated with the inductance thereof decreasing steeply to thereby allow a pulse-like voltage to rise up between the first and second main discharge electrodes. This voltage rise-up will scarcely suffer from any appreciable time delay because the inductance of the saturable transformer is decreased, as mentioned above.

According to a third aspect of the present invention, there is provided a discharge excitation type pulse laser apparatus which includes a pair of first and second main discharge electrodes disposed in opposition to each other for generating a main discharge therebetween, an auxiliary discharge electrode disposed in the vicinity of the second main discharge electrode for generating a corona discharge between the second main discharge electrode and the auxiliary discharge electrode, a first pulse generating circuit connected to the first and second main discharge electrodes for applying a pulse-like voltage for the main discharge between the first and second main discharge electrodes, a second pulse generating circuit connected to the second main discharge electrode and the auxiliary discharge electrode for applying a pulse-like voltage for generating the corona discharge between the second main discharge electrode and the auxiliary discharge electrode, a switching pulse generating means for controlling application and interruption of a voltage applied to the first and second main discharge electrodes from the first pulse generating circuit and a voltage applied to the second main discharge electrode and the auxiliary discharge electrode from the second pulse generating circuit, a saturable transformer connected between the switching pulse generating means and the first and second pulse generating circuits, and a first charging capacitor connected across both ends of the switching pulse generating means.

In the discharge electrode type pulse laser apparatus of the structure mentioned above, the circuit is so designed that the saturable transformer exhibits initially a large inductance. Thus, a voltage is induced in the secondary winding of the saturable transformer to trigger the operation of the second pulse generating circuit at the same time when the first charging capacitor is charged by the pulse-like voltage generated from the switching pulse generating means. As a result of this, there are generated voltages in the second pulse generating circuit and the secondary winding of the saturable transformer at a very high rate in correspondence to the switching time. Consequently, after the rise-up of the pulse-like voltage, the saturable transformer is magnetically saturated with the inductance thereof lowering nonlinearly to thereby allow a pulse-like voltage to rise up between the first and second main discharge electrodes. This voltage rise-up will scarcely suffer from any appreciable time delay because the inductance of the saturable transformer is lowered, as mentioned above.

In a further preferred mode for carrying out the present invention, the first pulse generating circuit may include a peaking capacitor having one end connected to a junction between the primary winding of the saturable transformer and the first main discharge electrode, the other end of the peaking capacitor being connected to a junction between the switching pulse generating means and the second main discharge electrode. The second pulse generating circuit includes a second charging capacitor connected between both ends of a secondary winding of the saturable transformer and a saturable reactor connected between the secondary winding of the saturable transformer and the auxiliary discharge electrode. The apparatus further includes a charging circuit element connected between the second main discharge electrode and the auxiliary discharge electrode. After charging the second charging capacitor by way of the first charging capacitor and the saturable transformer in response to a switching pulse-like voltage supplied from the switching pulse generating means, inductance of the saturable transformer and inductance of the saturable reactor may be decreased to allow a voltage to rise up between the auxiliary discharge electrode and the second main discharge electrode, while allowing a voltage to rise up between the first main discharge electrode and the second main discharge electrode.

In the discharge electrode type pulse laser apparatus of the structure mentioned above, the saturable transformer and the saturable reactor are both magnetically saturated with inductances thereof decreasing to thereby allow the voltage to be applied to the auxiliary discharge electrode from the second charging capacitor only after the second charging capacitor are charged by the pulse-like voltage supplied from the pulse generating means by way of the first charging capacitor and the saturable transformer. In this conjunction, the circuit loop mentioned above can be designed with low inductance. Accordingly, the voltage applied to the auxiliary discharge electrode can rise up steeply, which in turn means that the pulse-like voltage can rise up more steeply between the auxiliary discharge electrode and the second main discharge electrode.

In a yet further preferred mode for carrying out the present invention, the second pulse generating circuit may further include a delay circuit connected in series between the second charging capacitor and the auxiliary discharge electrode for causing a timing at which a pulse-like voltage applied across the auxiliary discharge electrode and the second main discharge electrode rises up to coincide substantially with a timing at which a pulse-like voltage applied across the first and second main discharge electrodes rises up.

By providing the delay circuit between the second charging capacitor and the auxiliary discharge electrode, as described above, it is possible to hold the voltage risen up due to saturation of the second saturable reactor as it is until the time point at which the voltage rises up between the first and second main discharge electrodes. This means that the voltage applied across the first and second main discharge electrodes can rise up before the amount of electrons generated upon preionization by the corona discharge decreases to any appreciable extent. Thus, the effectiveness of the preionization can be much enhanced.

In a still further preferred mode for carrying out the present invention, the second pulse generating circuit may further include a delay circuit connected in series between the third saturable reactor and the auxiliary discharge electrode for causing a timing at which a pulse-like voltage applied across the auxiliary discharge electrode and the second main discharge electrode rises up to coincide substantially with a timing at which a pulse-like voltage applied across the first and second main discharge electrodes rises up.

By providing the delay circuit between the third saturable reactor and the auxiliary discharge electrode, as described above, it is possible to hold the voltage risen up due to saturation of the third saturable reactor as it is until the time point at which the voltage rises up between the first main discharge electrode and the second main discharge electrode. This means that the voltage applied across the first and second main discharge electrodes can rise up before the amount of electrons generated upon preionization by the corona discharge decreases to any appreciable extent. Thus, the effectiveness of the preionization can be much enhanced.

In a further preferred mode for carrying out the present invention, the first pulse generating circuit may include a first charging capacitor connected in series between the first main discharge electrode and a primary winding of the saturable transformer and a first charging circuit element connected between the first and second main discharge electrodes. The second pulse generating circuit includes a delay circuit connected in series between the auxiliary discharge electrode and a secondary winding of the saturable transformer for causing a timing at which a pulse-like voltage applied across the auxiliary discharge electrode and the second main discharge electrode rises up to coincide substantially with a timing at which a pulse-like voltage applied across the first and second main discharge electrodes rises up.

By providing the delay circuit between the secondary winding of the saturable transformer and the auxiliary discharge electrode, as described above, it is possible to hold the voltage risen up due to saturation of the saturable transformer as it is until the time point at which the voltage rises up between the first and second main discharge electrodes. This means that the voltage applied across the first and second main discharge electrodes can rise up before the amount of electrons generated upon preionization by the corona discharge decreases to any appreciable extent. Thus, the effectiveness of the preionization can be much enhanced.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 16:
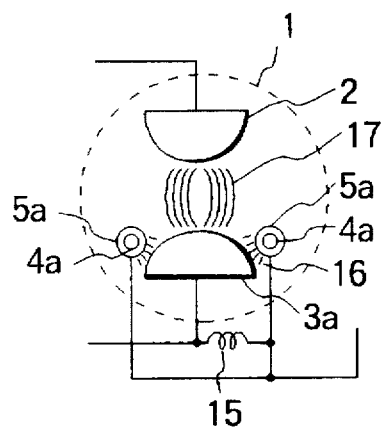
FIG. 16 is a top plan view showing an electrode structure according to another embodiment of the present invention.
Figure 17:
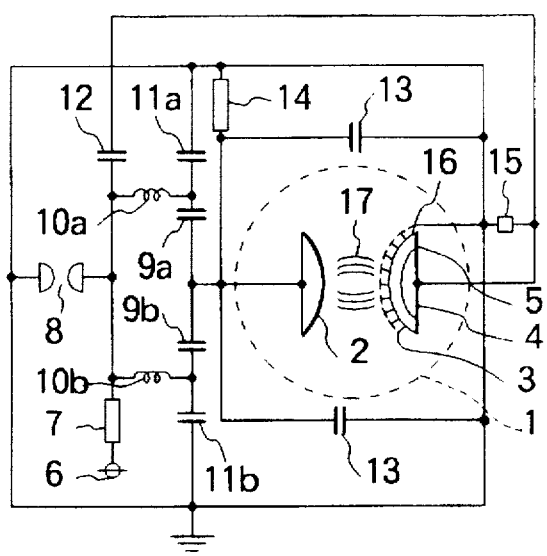
FIG. 17 is a circuit diagram showing a conventional discharge excitation type pulse laser apparatus known heretofore.

Now, the present invention will be described in detail in conjunction with what is presently believed to be preferred embodiments illustrated, only by way of example, in FIGS. 1 to 16, in which parts or components same as or equivalent to those mentioned hereinbefore by reference to FIG. 17 are denoted by like reference characters and repeated description thereof will be omitted.

Embodiment 1

Figure 1:
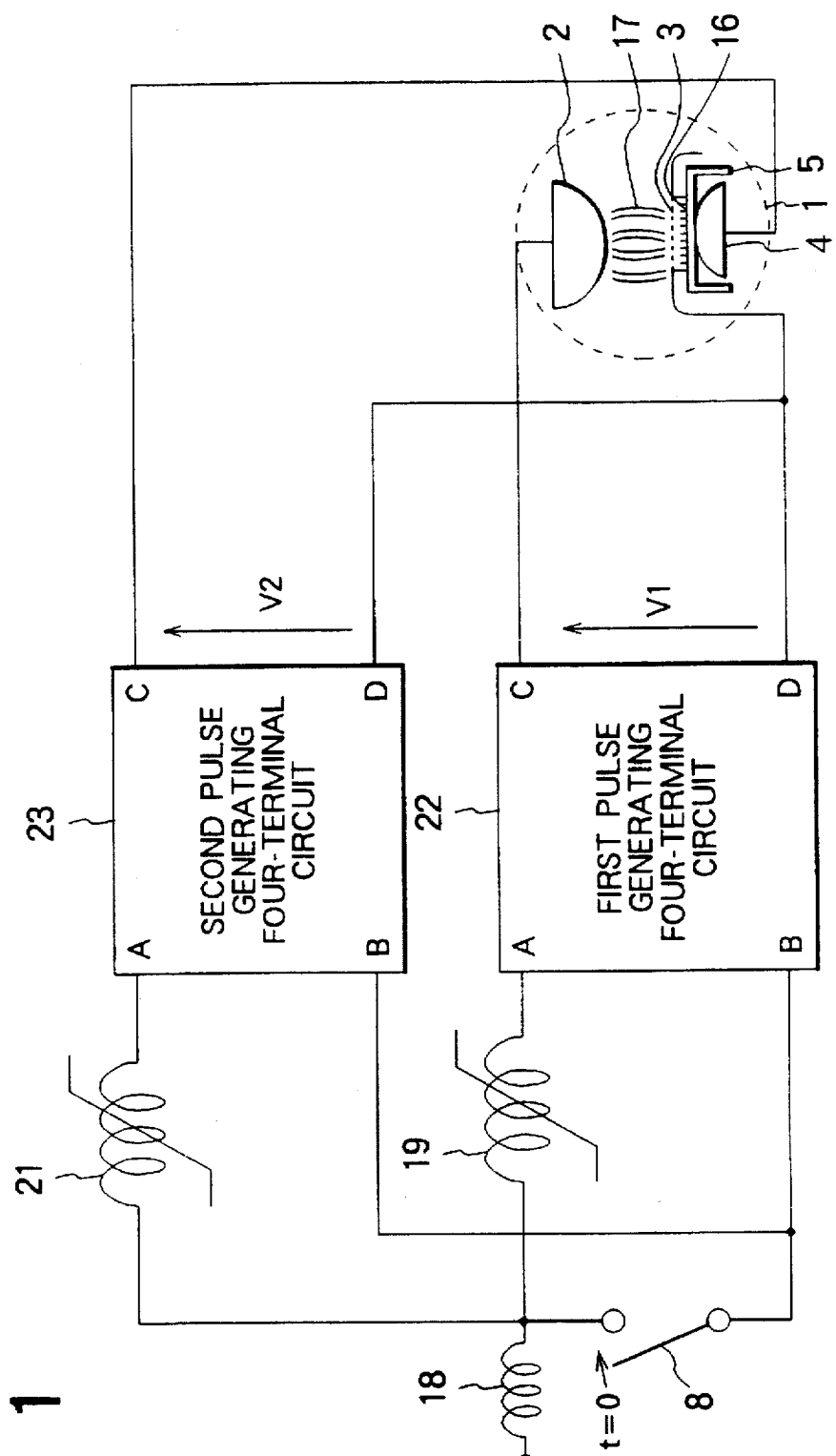
FIG. 1 is a circuit diagram showing schematically a general arrangement of a discharge excitation type pulse laser apparatus according to a first embodiment of the present invention.
Figure 2:
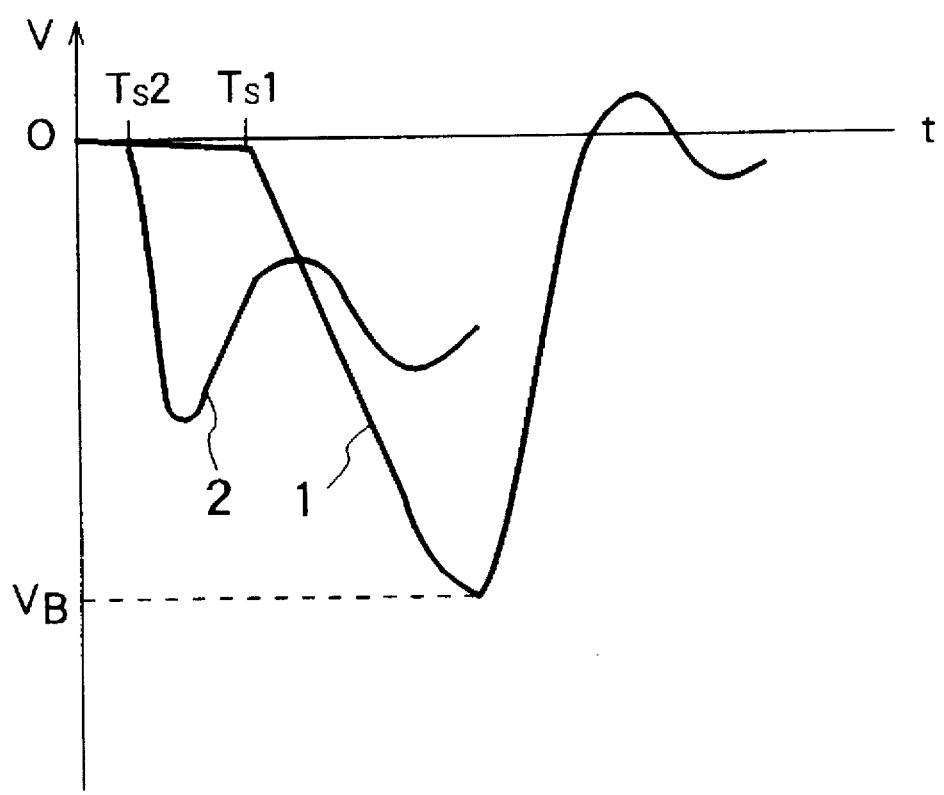
FIG. 2 is a voltage waveform diagram for illustrating operations of the discharge excitation type pulse laser apparatus shown in FIGS. 1 and 5.

FIG. 1 is a circuit diagram showing generally a configuration of a discharge excitation type pulse laser apparatus according to a first embodiment of the present invention and FIG. 2 is a voltage waveform diagram for illustrating operation of the discharge excitation type pulse laser apparatus of the instant embodiment. Parenthetically, FIG. 2 will also be referred to in describing a third embodiment of the invention.

Referring to FIG. 1, the discharge excitation type pulse laser apparatus according to the instant embodiment includes a charging reactor 18, a first saturable reactor 19, a first pulse generating four-terminal circuit 22 serving as a first pulse generating circuit, and a second pulse generating four-terminal circuit 23 serving as a second pulse generating circuit in addition to the components of the conventional discharge excitation type pulse laser apparatus described hereinbefore by reference to FIG. 17.

The charging reactor 18 has one end connected to the charging terminal 6 while the other end of the reactor 18 is connected to a junction at which the first and second saturable reactors 19 and 21 are connected to each other.

The first saturable reactor 19 has one end connected to the first terminal A of the first pulse generating four-terminal circuit 22 and the other end connected to one end of the switching device 8 which may be constituted by a discharge type switch having a spark gap in which electric discharge is caused to take place for effecting the switching operation. The other end of the switching device 8 is connected to a second terminal B of the first pulse generating four-terminal circuit 22 as well as to a second terminal B of the second pulse generating four-terminal circuit 23.

On the other hand, one end of the second saturable reactor 21 is connected to a first terminal A of the second pulse generating four-terminal circuit 23 while the other end of the second saturable reactor 21 is connected to the one end of the switching device 8.

The first pulse generating four-terminal circuit 22 has a third terminal C and a fourth terminal D which are connected to the first and second main discharge electrodes 2 and 3, respectively, while the third terminal C and the fourth terminal D of the second pulse generating four-terminal circuit 23 are connected to the second main discharge electrode 3 and the auxiliary discharge electrode 4, respectively.

Next, operation of the discharge excitation type pulse laser apparatus will be described by reference to a waveform diagram of FIG. 2.

Figure 18:
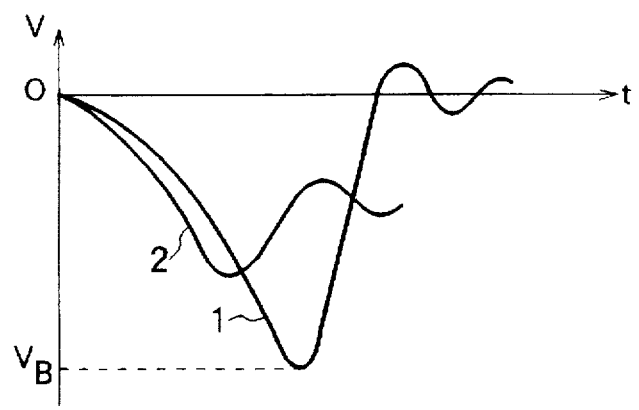
FIG. 18 is a waveform diagram for illustrating operations of the same.

Assuming now that an electric discharge takes place in the spark gap of the switching device 8 at a time point t (=0), the directions of the currents flowing through the first and second saturable reactors 19 and 21 are reversed relative to those of the currents flowing through these reactors upon charging thereof. Accordingly, the cores of these reactors 18 and 21 assume the unsaturated states, respectively. Thus, the first and second saturable reactors 19 and 21 can now operate as the reactors each of a large capacity, as described hereinbefore in conjunction with the conventional apparatus by reference to FIG. 18, as a result of which operation of the first pulse generating four-terminal circuit 22 as well as that of the second pulse generating four-terminal circuit 23 is suppressed. In the meanwhile, the spark gap of the switching device 8 assumes a fully conducting state (i.e., fully closed state) with the stray inductance and resistance components being suppressed to a minimum. At a time point t (=Ts2), the core of the second saturable reactor 21 is fully saturated, as a result of which the inductance of the saturable reactor 21 steeply decreases nonlinearly. At this time point (i.e., t (=Ts2)), however, the inductance of the first saturable reactor 19 still remains at a large value. As a consequence, the voltage outputted from the second pulse generating four-terminal circuit 23 rises up at a high speed or rate because the stray inductance and resistance components of the spark gap of the switching device 8 are suppressed to minimum values, respectively, as mentioned above.

Referring continuously to FIG. 2, when the core of the first saturable reactor 19 becomes the saturated at a time point t (=Ts1) in the course of the discharge, the inductance of the first saturable reactor 19 steeply decreases nonlinearly. As can be seen from a waveform 1 shown in FIG. 2, the rise-up rate of the pulse-like voltage applied across the first and second main discharge electrodes 2 and 3 is determined by the value of the inductance decreased steeply. In other words, the pulse-like voltage applied between the first and second main discharge electrodes 2 and 3 rises up at a high rate, as in the case of the conventional discharge excitation type pulse laser apparatus shown in FIG. 17. Consequently, the discharge start voltage (firing potential) $V_B$ becomes high, whereby the energy injected into the main discharge 17 is increased. Thus, the problem of the conventional discharge excitation type pulse laser apparatus mentioned hereinbefore can successfully be solved.

Embodiment 2

Figure 3:
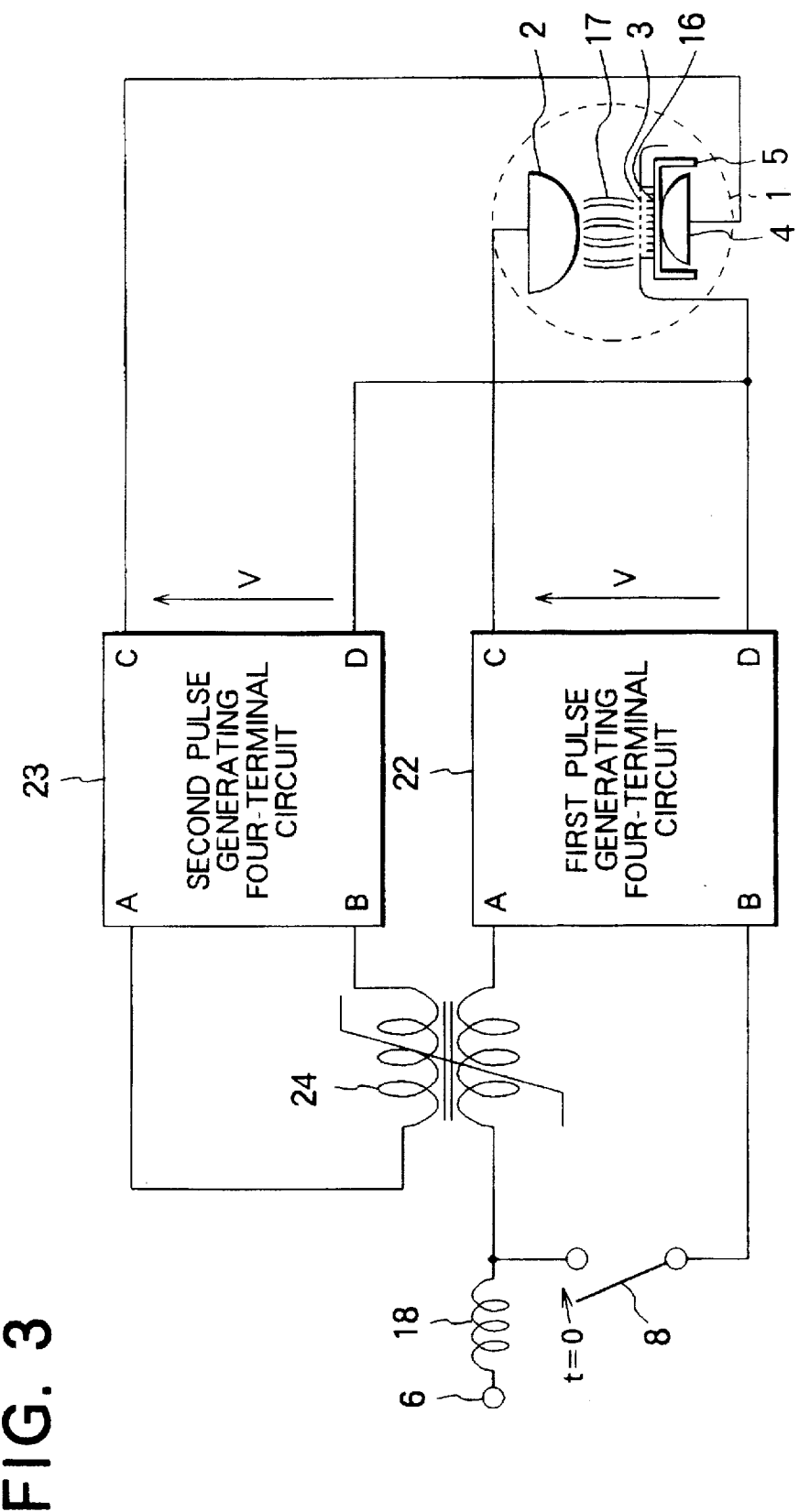
FIG. 3 is a circuit diagram showing a general arrangement of a discharge excitation type pulse laser apparatus according to a second embodiment of the present invention.

Next, a discharge excitation type pulse laser apparatus according to a second embodiment of the invention will be described by reference to a circuit diagram of FIG. 3, in which like reference numerals as those used in FIGS. 1 and 17 denote like or equivalent parts. The discharge excitation type pulse laser apparatus according to the instant embodiment now under consideration differs from the apparatus of the first embodiment in that a saturable transformer 24 is employed in place of both the first and second saturable reactors 19 and 21, wherein one end of a primary winding of the saturable transformer 24 is connected to the first terminal A of the first pulse generating four-terminal circuit 22 with the other end thereof being connected to one end of the charging reactor 18. On the other hand, both ends of a secondary winding of the saturable transformer 24 are connected to the first and second terminals A and B of the second pulse generating four-terminal circuit 23, respectively.

Figure 4:
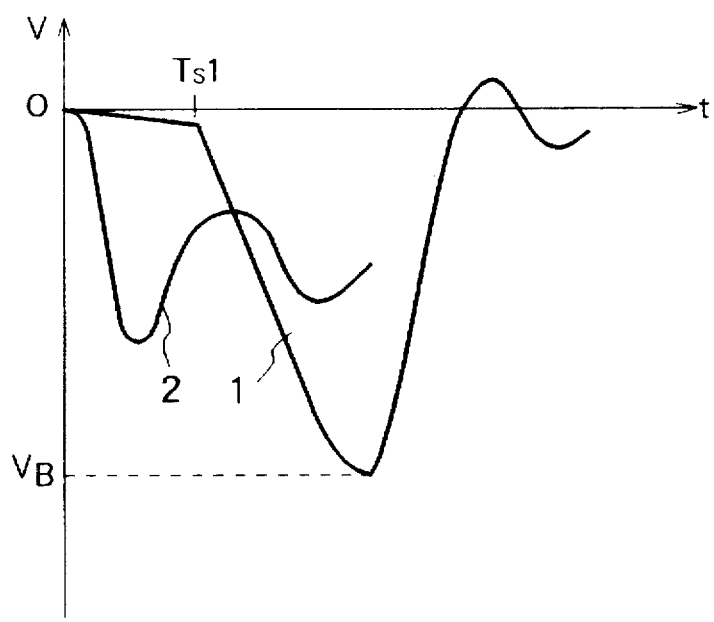
FIG. 4 is a voltage waveform diagram for illustrating operations of the discharge excitation type pulse laser apparatus shown in FIGS. 3 and 10.

Now, operation of the discharge excitation type pulse laser apparatus according to the instant embodiment of the invention will be elucidated by reference to a waveform diagram of FIG. 4.

It is assumed that electric discharge takes place in the spark gap of the switching device 8 at a time point t (=0). Then, a voltage is induced in the secondary winding of the saturable transformer 24 to cause the second pulse generating four-terminal circuit 23 to perform the charging operation for the preionization. However, operation of the first pulse generating four-terminal circuit 22 is inhibited until the core of the saturable transformer 24 has attained the magnetically saturated state. In the meanwhile, the spark gap of the switching device 8 assumes a fully conducting state (i.e., the switching device 8 is closed fully or completely, to say in another way), which in turn means that the stray inductance and resistance components of the switching device 8 become minimum.

Further referring to FIG. 2, when the core of the saturable transformer 24 assumes the magnetically saturated state at a time point t (=Ts1) in the course of progress of the discharge process, the inductance of the saturable transformer 24 steeply decreases nonlinearly. As mentioned hereinbefore, the rise-up rate of the pulse-like voltage making appearance across the first and second main discharge electrodes 2 and 3 is determined by the value of the inductance of the transformer 24 decreased steeply. In other words, the pulse-like voltage between the first and second main discharge electrodes 2 and 3 rises up at a high rate as described hereinbefore by reference to FIG. 18 in conjunction with the conventional discharge excitation type pulse laser apparatus. Consequently, the discharge start voltage (firing potential) $V_B$ becomes high, whereby the energy injected into the main discharge 17 is caused to increase.

At this juncture, it should be mentioned that in the discharge excitation type pulse laser apparatuses according to the first and second embodiments of the invention the first pulse generating four-terminal circuit 22 may be implemented in any appropriate circuit configuration so far as it can apply a predetermined pulse-like discharging voltage across the second main discharge electrode 3 and the auxiliary discharge electrode 4. Similarly, the second pulse generating four-terminal circuit 23 may be constituted by a circuit of any suitable configuration so far as a predetermined corona discharge trigger-pulse like voltage can be applied across the auxiliary discharge electrode 4 and the second main discharge electrode 3.

Embodiment 3

Figure 5:
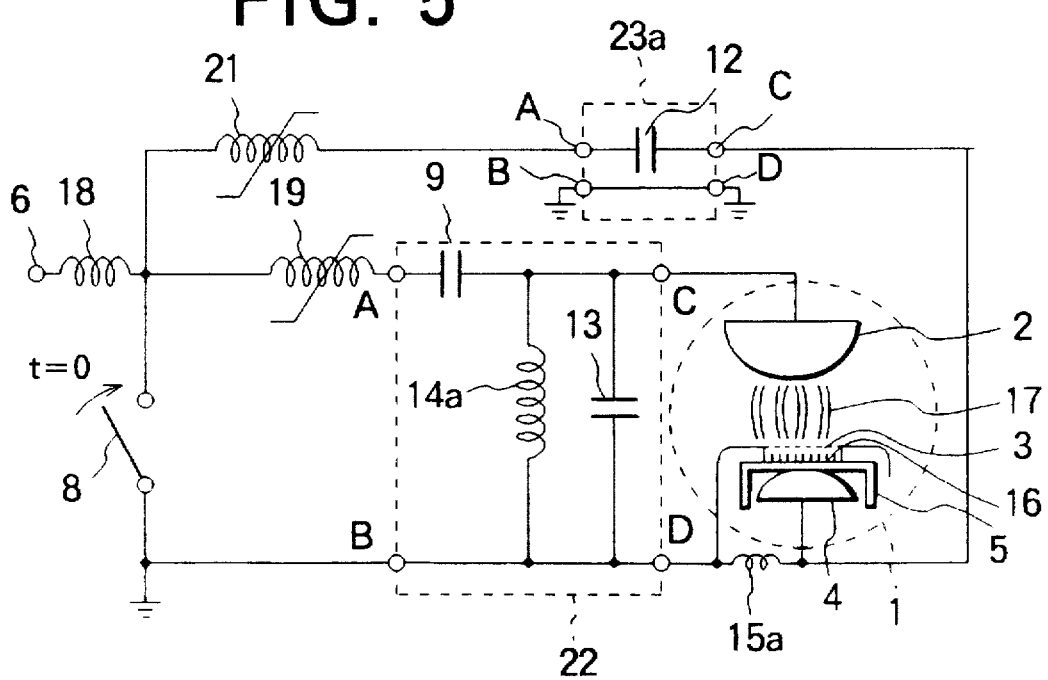
FIG. 5 is a circuit diagram showing a configuration of a discharge excitation type pulse laser apparatus according to a third embodiment of the present invention.

FIG. 5 is a circuit diagram showing a third embodiment of the invention which is directed to preferred circuit configurations of the first and second pulse generating four-terminal circuits 22 and 23, respectively, which can be employed in the discharge excitation type pulse laser apparatus shown in FIG. 1. In FIG. 5, parts same as or equivalent to those shown in FIG. 1 and FIG. 17 are denoted by like reference characters and repeated description thereof is omitted.

More specifically, in the first pulse generating four-terminal circuit 22 shown in FIG. 5, a first charging capacitor 9 is connected to the first terminal A and the third terminal C of the first pulse generating four-terminal circuit 22, wherein a charging reactor 14a and the peaking capacitor 13 are connected in parallel with each other and inserted between a connecting conductor interconnecting the first charging capacitor 9 and the third terminal C and a connecting conductor interconnecting the second terminal B and the fourth terminal D. The charging reactor 14a and the peaking capacitor 13 cooperate to constitute a first charging circuit means in the discharge excitation type pulse laser apparatus according to the present invention.

On the other hand, in the second pulse generating four-terminal circuit 23a, a second charging capacitor 12 is connected between the first terminal A and the third terminal C of the second pulse generating four-terminal circuit 23a, wherein the second terminal B and the fourth terminal D are connected to the ground potential. A charging reactor 15a is connected between the second main discharge electrode 3 and the auxiliary discharge electrode 4. Further, one end of a second charging capacitor 12 is connected directly to the third terminal C and at the same time to the fourth terminal D of the first pulse generating four-terminal circuit 22 indirectly via the charging reactor 15a. To say in another way, the second charging capacitor 12 is connected to the ground potential via the third terminal C of the second pulse generating four-terminal circuit 23a and the charging reactor 15a as well as the fourth terminal D and the second terminal B of the first pulse generating four-terminal circuit 22. The charging reactor 15a constitutes the second charging circuitry means of the discharge excitation type pulse laser apparatus according to the invention.

Next, referring to FIG. 2, description will turn to operation of the discharge excitation type pulse laser apparatus according to the instant embodiment. As mentioned previously in conjunction with the conventional pulse laser apparatus, the first and second charging capacitors 9 and 12 are first charged via the charging reactor 18. Through this charging process, the cores of the first and second saturable reactors 19 and 21 are set to the state saturated with one polarity. When the spark gap of the switching device 8 is fired at a time point t (=0), the first and second charging capacitors 9 and 12 start to discharge. At this time, the directions of the currents flowing through the first and second saturable reactors 19 and 21 are reversed relative to the directions of the currents flowing through these reactors upon charging thereof. Consequently, the cores of the first and second saturable reactors 19 and 21 become unsaturated. Thus, the first and second saturable reactors 19 and 21 function as the reactors each exhibiting a large capacity to thereby suppress the discharges of the first and second charging capacitors 9 and 12, as described hereinbefore by reference to the waveform diagram of FIG. 18. In the meanwhile, the spark gap of the switching device 8 becomes fully conducting (i.e., the switching device 8 is closed completely in the equivalent sense) with the stray inductance and resistance components decreasing to minimum.

At a time point t (=Ts2), the core of the second saturable reactor 21 becomes magnetically saturated with the inductance thereof steeply decreasing nonlinearly. At this time point, however, inductance of the first saturable reactor 19 continues to be of a large value. The stray inductance and resistance components of the switching device 8 is minimized. Thus, the second charging capacitor 12 can discharge at a high rate, as a result of which the preionization of the space between the main electrodes 2 and 3 due to the corona discharge 16 is accelerated remarkably. In this manner, the effect aimed by the invention can be achieved owing to the increasing of the capacity of the first saturable reactor 19.

Now, when a time point t (=Ts1) is reached as the discharge process progresses, the core of the first saturable reactor 19 becomes magnetically saturated, as a result of which inductance thereof steeply decreases nonlinearly, as can be seen in FIG. 2. The rise-up rate of the pulse-like voltage applied across the first and second main discharge electrodes 2 and 3 is determined by the steeply decreased value of the inductance mentioned above, as can be seen from the waveform 1 shown in FIG. 2. In this way, the pulse-like voltage between both the first and second main discharge electrodes 2 and 3 rises up at a high rate with the discharge start voltage (firing potential) $V_B$ being increased, which of course contribute to increasing of the amount of energy injected into the main discharge 17. Thus, it can be appreciated that the problem of the hitherto known laser apparatus pointed out hereinbefore can successfully be solved by the instant embodiment of the invention.

Embodiment 4

Next, a fourth embodiment of the present invention will be described by reference to a circuit diagram of FIG. 6.

Figure 6:
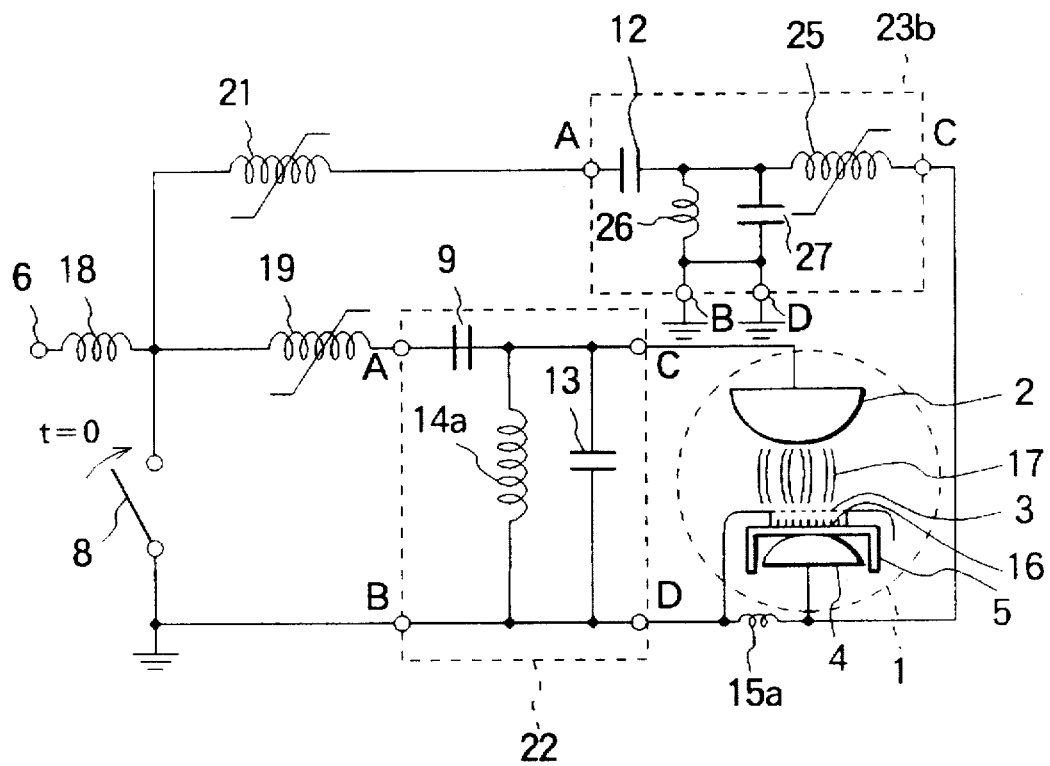
FIG. 6 is a circuit diagram showing a configuration of a discharge excitation type pulse laser apparatus according to a fourth embodiment of the present invention.

The instant embodiment now under consideration differs from the third embodiment described above in respect to the configuration of the second pulse generating four-terminal circuit 23 which is generally denoted by a reference character 23b in FIG. 6. In the case of the second pulse generating four-terminal circuit 23b of the discharge excitation type pulse laser apparatus according to the instant embodiment, one end of the second charging capacitor 12 is connected to the second saturable reactor 21 via the first terminal A while the other end of the second charging capacitor 12 is connected to one end of a third saturable reactor 25 which has the other end connected to the auxiliary discharge electrode 4 via the third terminal C. Furthermore, a parallel connection of a charging reactor 26 and a first charge transfer capacitor 27 is inserted between a junction at which the second charging capacitor 12 and the third saturable reactor 25 are interconnected and the second and fourth terminals B and D which are connected to the ground potential.

Figure 7:
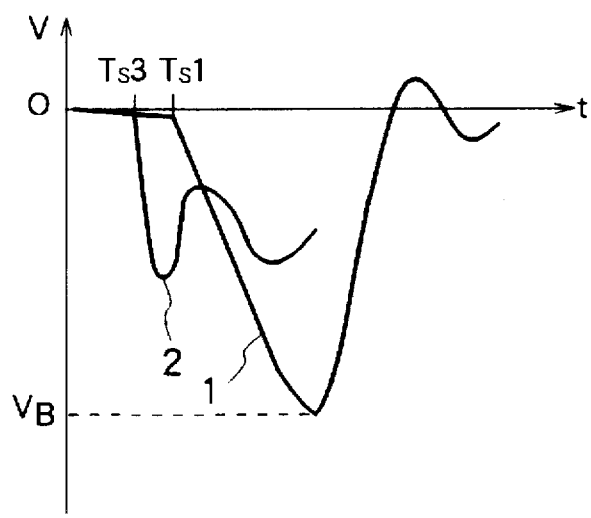
FIG. 7 is a voltage waveform diagram for illustrating operations of the discharge excitation type pulse laser apparatus shown in FIG. 6.

Now, referring to a waveform diagram of FIG. 7, description will turn to operation of the discharge excitation type pulse laser apparatus according to the instant embodiment of the invention. As mentioned previously in conjunction with the conventional pulse laser apparatus, the first and second charging capacitors 9 and 12 are first charged via the charging reactor 18. In the course of this charging process, the cores of the first and second saturable reactors 19 and 21 are set to the state saturated with one polarity. When the spark gap of the switching device 8 is fired (i.e., when the switching device 8 becomes conductive) at a time point t (=0), each of the first and second charging capacitors 9 and 12 starts to discharge. At this time, the directions of the currents flowing through the first and second saturable reactors 19 and 21 are reversed relative to the directions upon charging of these reactors. Consequently, the cores of the first and second saturable reactors 19 and 21 become unsaturated. Thus, each of the first and second saturable reactors 19 and 21 exhibits a large capacity and functions as to suppress the discharges of the first and second charging capacitors 9 and 12. In the meanwhile, the spark gap of the switching device 8 becomes fully conducting with the stray inductance and resistance components being suppressed to a minimum.

Now, at a time point t (=Ts2) at which the core of the second saturable reactor 21 assumes the saturated state, the inductance thereof steeply decreases nonlinearly. At this time point, however, the inductance of the first saturable reactor 19 continues to be of a large value with the stray inductance and resistance components of the switching device 8 being minimized. As a consequence, charge transfer to the first charge transfer capacitor 27 from the second charging capacitor 12 is accelerated.

Subsequently, at a time point t (=Ts3), the core of the third saturable reactor 25 becomes magnetically saturated with the inductance thereof steeply decreasing nonlinearly. Because the loop extending from the first charge transfer capacitor 27 to the auxiliary discharge electrode 4 by way of the third saturable reactor 25 which is saturated exhibits inductance smaller than that of the loop formed by the spark gap of the switching device 8, the second saturable reactor 21, the second charging capacitor 12 and the first charge transfer capacitor 27, the voltage applied to the auxiliary discharge electrode 4 rises up more steeply, to thereby promote more intensively the preionization by the corona discharge 16.

Now, when a time point t (=Ts1) is reached as the discharge process progresses, the core of the first saturable reactor 19 becomes magnetically saturated, as a result of which inductance thereof steeply decreases nonlinearly, as can be seen in FIG. 7. Consequently, the rise-up rate of the pulse-like voltage applied across the first and second main discharge electrodes 2 and 3 is determined by the value of the steeply lowered inductance. Thus, as can be seen from the waveform 1 shown in FIG. 7, the pulse-like voltage between both the first and second main discharge electrodes 2 and 3 rises up at a high rate with the discharge start voltage (firing potential) $V_B$ being increased, which of course contribute to increasing of the amount of energy injected into the main discharge path 17. It is apparent that the problem of the conventional discharge excitation type pulse laser apparatus mentioned hereinbefore can equally be solved by the instant embodiment of the invention.

Embodiment 5

Next, a fifth embodiment of the present invention will be described by reference to a circuit diagram of FIG. 8.

Figure 8:
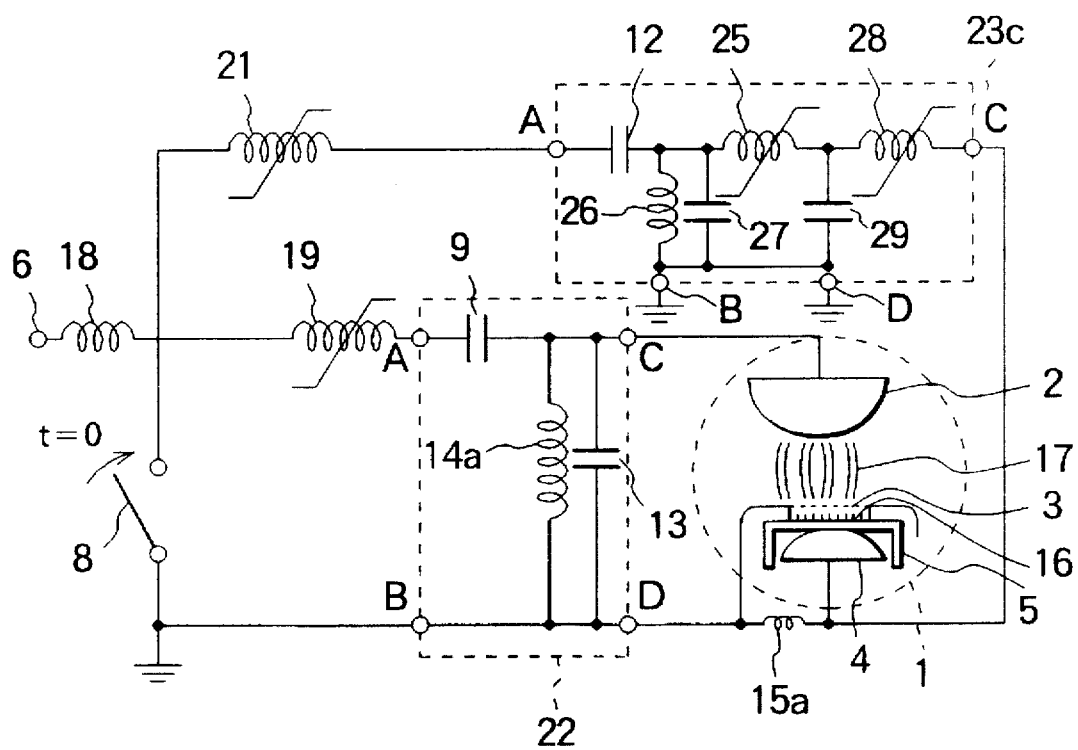
FIG. 8 is a circuit diagram showing a configuration of a discharge excitation type pulse laser apparatus according to a fifth embodiment of the present invention.

The discharge excitation type pulse laser apparatus now under consideration differs from the fourth embodiment described above in respect to the configuration of the second pulse generating four-terminal circuit which is generally denoted by a reference character 23c in FIG. 8. More specifically, the charging reactor 26 and the first charge transfer capacitor 27 connected in parallel and having one ends connected to the junction between the second charging capacitor 12 and the third saturable reactor 25 have the respective other ends connected mutually and connected to the ground potential by way of the second terminal B (i.e., connected to the second main discharge electrode 3), wherein the other end of the third saturable reactor 25 is connected to the one end of a fourth saturable reactor 28 which has the other end connected to the auxiliary discharge electrode 4 via the third terminal C. The junction between the third saturable reactor 25 and the fourth saturable reactor 28 is connected to the ground potential by way of the second charge transfer capacitor 29 and the fourth terminal D thereof (i.e., the junction mentioned above is connected to the second main discharge electrode 3, to say in another way). Further, the grounded ends of the first and second charge transfer capacitors 27 and 29 are connected to each other.

Next, description will turn to operation of the discharge excitation type pulse laser apparatus according to the instant embodiment. As mentioned previously in conjunction with the conventional pulse laser apparatus, the first and second charging capacitors 9 and 12 are first charged via the charging reactor 18. Through this charging process, the cores of the first and second saturable reactors 19 and 21 are set to the state saturated with one polarity. When the spark gap of the switching device 8 is fired at the time point t (=0), each of the first and second charging capacitors 9 and 12 starts to discharge. At this time point, the currents flowing through the first and second saturable reactors 19 and 21 are reversed in respect to the directions of the currents flowing through these reactors upon charging thereof. Consequently, the cores of the first and second saturable reactors 19 and 21 become unsaturated. Thus, the first and second saturable reactors 19 and 21 function as the reactors each exhibiting a large capacity to thereby suppress the discharge of the first and second charging capacitors 9 and 12. In the meanwhile, the spark gap of the switching device 8 becomes fully conducting with the stray inductance and resistance components decreasing to minimum.

At a time point t (=Ts2), the core of the second saturable reactor 21 becomes magnetically saturated, upon which the inductance thereof steeply decreases nonlinearly. At this time point, however, the inductance of the first saturable reactor 19 continues to be of a large value while the stray inductance and resistance component of the switching device 8 become minimum. Thus, the charge transfer from the second charging capacitor 12 to the first charge transfer capacitor 27 is started at a high rate.

Subsequently, at a time point t (=Ts3), the core of the third saturable reactor 25 becomes magnetically saturated with the inductance thereof steeply decreasing nonlinearly. Because the loop for transferring the electric charge from the first charge transfer capacitor 27 to the second charge transfer capacitor 29 by way of the third saturable reactor 25 which is in the saturated state has an inductance smaller than that of the loop formed by the spark gap of the switching device 8, the second saturable reactor 21, the second charging capacitor 12 and the first charge transfer capacitor 27, the voltage applied to the second charge transfer capacitor 29 can rise up more steeply, to thereby promote the preionization by the corona discharge 16.

By the way, it should be mentioned that when an electron adhesive gas such as a gas mixture of $F_2$ and $C_{12}$ or the like is hermetically filled in the laser chamber 1, the quantity of electrons once generated by the preionization tends to decrease due to absorption by these electron adhesive gases. However, this problem can satisfactorily be solved by the structure of the discharge excitation type pulse laser apparatus according to the instant embodiment of the invention.

Figure 9:
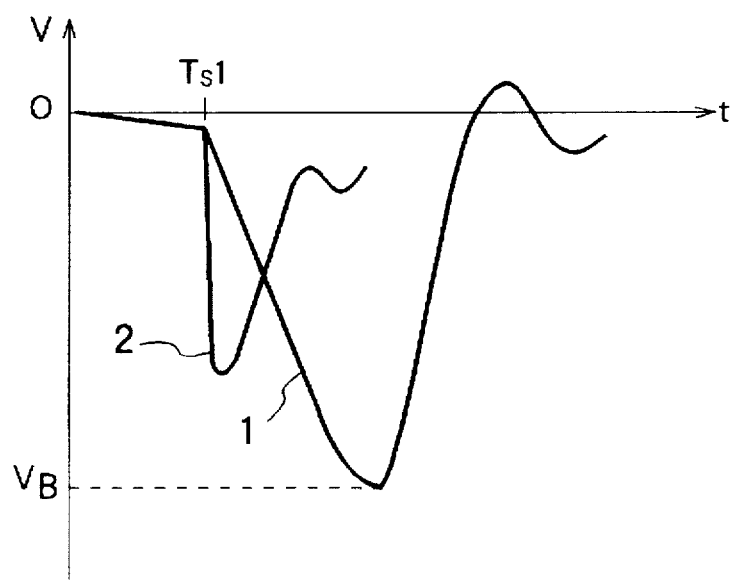
FIG. 9 is a voltage waveform diagram for illustrating operations of the discharge excitation type pulse laser apparatus shown in FIG. 8.

FIG. 9 shows the waveforms of the individual pulse-like voltages for illustrating operation of the pulse laser apparatus described above. In the discharge excitation type pulse laser apparatus according to the instant embodiment of the invention, such arrangement is adopted that the inductance of the fourth saturable reactor 28 can continuously remain at a large value until the voltage applied to the second charge transfer capacitor 29 rises up.

As the discharge process progresses as shown in FIG. 9, the core of the first saturable reactor 19 becomes magnetically saturated at a time point t (=Ts1), being accompanied with nonlinear steep decrease of the first saturable reactor 19. At the same time, the core of the fourth saturable reactor 28 is changed over to the magnetically saturated state with the inductance thereof steeply lowering nonlinearly, which results in that the voltage applied across the auxiliary discharge electrode 4 and the second main discharge electrode 3 increases steeply. As a consequence, the timing at which the first main discharge electrode 2 rises up coincides with the timing at which the voltage applied across the auxiliary discharge electrode 4 and the second main discharge electrode 3 rises up steeply. As a consequence, the timing at which the first main discharge electrode 2 rises up coincides with the timing at which the voltage of the waveform 1 makes appearance between the first and second main discharge electrodes 2 and 3. Thus, the unwanted phenomenon that electrons generated upon the preionization by the corona discharge are absorbed by the laser gas can satisfactorily be suppressed, which allows smooth transition to the main discharge.

In the case of the second pulse generating four-terminal circuit 23c described above, one fourth saturable reactor 28 and one second charge transfer capacitor 29 are additionally inserted, respectively, between the third saturable reactor 25 and the auxiliary discharge electrode 4. It goes however without saying that a plurality of additional saturable reactors may be connected in series with a corresponding number of charge transfer capacitors connected to each of the saturable reactors, respectively.

Embodiment 6

A sixth embodiment of the invention is directed to concrete circuit configurations of the first pulse generating four-terminal circuit 22 and the second pulse generating four-terminal circuit 23, respectively, which will be described below by reference to FIG. 10.

Figure 10:
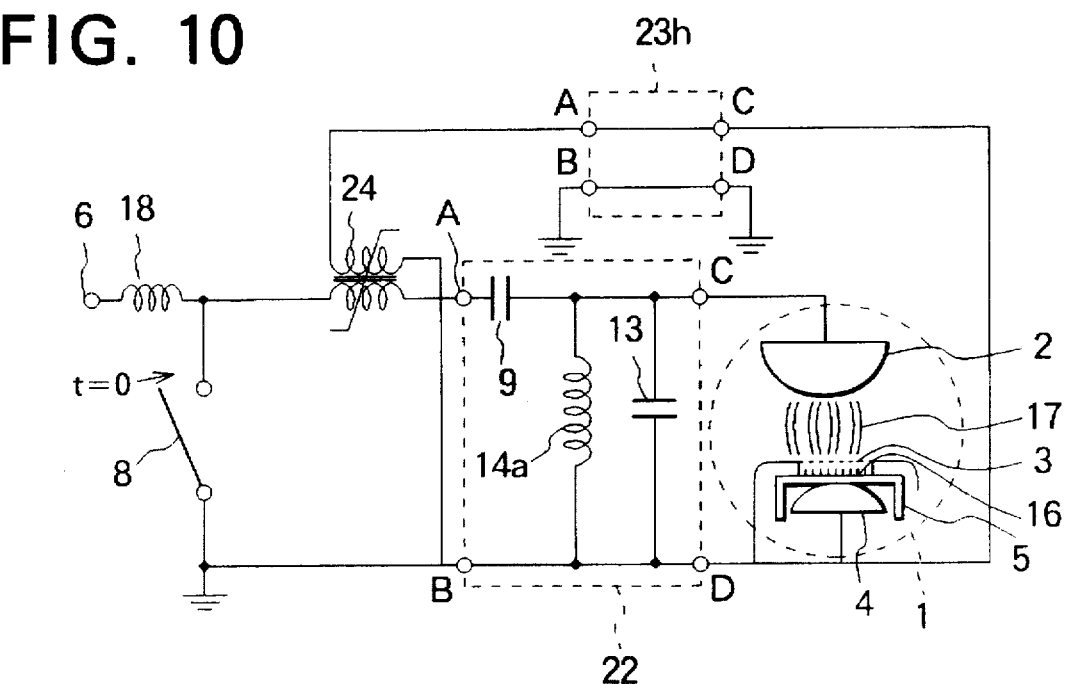
FIG. 10 is a circuit diagram showing a configuration of a discharge excitation type pulse laser apparatus according to a sixth embodiment of the present invention.

As can be seen in FIG. 10, one end of the secondary winding of the saturable transformer 24 is connected directly to the second terminal B of the first pulse generating four-terminal circuit 22 and indirectly to the second main discharge electrode 3 by way of the fourth terminal D. On the other hand, the other end of the secondary winding of the saturable transformer 24 is connected to the first terminal A of the second pulse generating four-terminal circuit which is denoted by 23h, wherein the first terminal A and the second terminal B of the second pulse generating four-terminal circuit 23h are directly connected to each other by a connecting conductor. Further, the third terminal C of the second pulse generating four-terminal circuit 23h is connected to the auxiliary discharge electrode 4. The second terminal B and the fourth terminal D of the second pulse generating four-terminal circuit 23h are directly interconnected and at the same time connected to the ground potential.

Next, operation of the discharge excitation type pulse laser apparatus according to the instant embodiment of the invention will be described by reference to FIG. 4. At first, the first charging capacitor 9 is charged by way of the charging reactor 14a. During this charging process, the core of the saturable transformer 24 is magnetically saturated with one polarity. When the spark gap of the switching device 8 is fired at a time point t (=0), the first charging capacitor 9 starts to discharge. Since the direction of the current flowing through the saturable transformer 24 at this time point is reversed relative to that of the current flowing therethrough during the charging process, the core of the saturable transformer 24 is changed over to the unsaturated state. Thus, when the spark gap of the switching device 8 is closed, a voltage having a steep rise-up edge is induced in the secondary winding of the saturable transformer 24. At this time point, the inductance of the saturable transformer 24 is, however, of a large value. As a consequence, the discharge of the first charging capacitor 9 is suppressed. In the meanwhile, the spark gap of the switching device 8 becomes fully closed (i.e., fully conducting). Thus, the stray inductance and resistance components of the switching device 8 become minimum.

Now, when a time point t (=Ts1) is reached as the discharge process progresses, the core of the saturable transformer 24 becomes magnetically saturated as a result of which inductance thereof steeply decreases nonlinearly, as can be seen in FIG. 4. The rise-up rate of the pulse-like voltage applied across the first and second main discharge electrodes 2 and 3 is determined by the steeply lowered value of the above-mentioned inductance, as can be seen from the waveform 1 illustrated in FIG. 4. In this manner, the pulse-like voltage applied between both the first and second main discharge electrodes 2 and 3 rises up at a high rate with the discharge start voltage (firing potential) $V_B$ increasing, which of course contribute to increasing of the energy injected into the main discharge 17.

Embodiment 7

Figure 11:
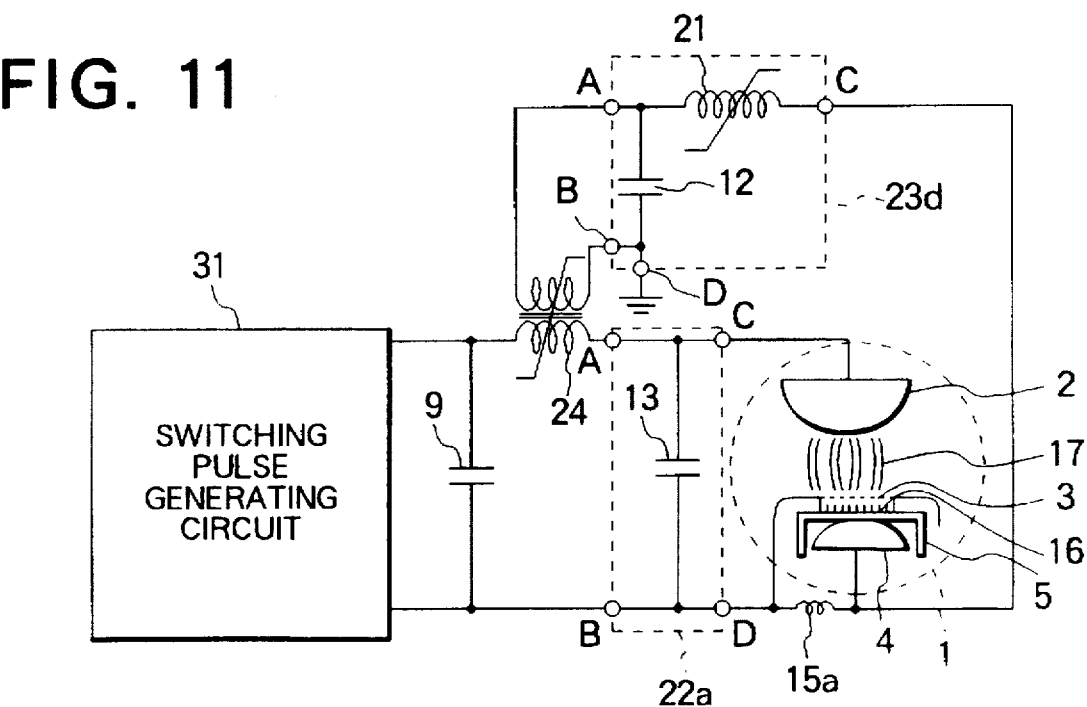
FIG. 11 is a circuit diagram showing schematically a configuration of a discharge excitation type pulse laser apparatus according to a seventh embodiment of the present invention.

FIG. 11 is a circuit diagram showing a structure of the discharge excitation type pulse laser apparatus according to a seventh embodiment of the present invention.

The discharge excitation type pulse laser apparatus now under consideration differs from the second embodiment in that the first terminal A connected to the saturable transformer 24 of the first pulse generating four-terminal circuit 22a and the third terminal C connected to the first main discharge electrode 2 are directly connected to each other, while the second terminal B of the first pulse generating four-terminal circuit 22a and the fourth terminal D thereof are mutually connected, wherein a peaking capacitor 13 is inserted between the junction of the first terminal A and the third terminal C and the junction of the second terminal B and the fourth terminal D.

Further, one end of a primary winding of the saturable transformer 24 is connected to the first terminal A of the first pulse generating four-terminal circuit 22a, while the other end of the primary winding is connected to one terminal of a switching pulse generating circuit 31 which serves as a pulse generating means and has the other terminal to which the second terminal B of the first pulse generating four-terminal circuit 22a is connected. Connected between both terminals of the switching pulse generating circuit 31 is the first charging capacitor 9.

The saturable transformer 24 has a secondary winding having one end connected to the first terminal A of the second pulse generating four-terminal circuit 23d and the other end connected to the second terminal B thereof, wherein the second charging capacitor 12 is connected between the first and second terminals A and B with the second terminal B being connected to the fourth terminal D which is grounded. Additionally, the second saturable reactor 21 is inserted between the first terminal A and the third terminal C of the second pulse generating four-terminal circuit 23d.

Now, description will turn to operation of the discharge excitation type pulse laser apparatus according to the instant embodiment by reference to FIG. 9. At first, a pulse-like voltage is generated by the switching pulse generating circuit 31 at a time point t (=0), whereby the first charging capacitor 9 is charged. At this time point, the core of the saturable transformer 24 is not yet saturated, and a voltage is induced in the secondary winding thereof upon charging of the first charging capacitor 9. Since the saturable transformer 24 exhibits a large inductance, the charging of the peaking capacitor 13 is suppressed. On the other hand, the second charging capacitor 12 is charged by the voltage induced in the secondary winding of the saturable transformer 24. At this time point, however, the second saturable reactor 21 is in the unsaturated state. Consequently, the voltage of the second charging capacitor 12 is prevented from being applied to the auxiliary discharge electrode 4.

Now, when a time point t (=Ts1) is reached as the discharge process progresses, the core of the first saturable reactor 19 becomes magnetically saturated, as a result of which inductance thereof steeply decreases nonlinearly, as can be seen in FIG. 9. The rise-up rate of the pulse-like voltage applied across the first and second main discharge electrodes 2 and 3 is determined by the steeply lowered value of the above-mentioned inductance, as can be seen from the waveform 1 shown in FIG. 9. In this manner, the pulse-like voltage applied between both the first and second main discharge electrodes 2 and 3 rises up at a high rate because of the low inductance of the circuit with the discharge start voltage (firing potential) $V_B$ being increased, which of course contributes to increasing of the energy injected into the main discharge 17. Since the second saturable reactor 21 is so arranged as to be saturated with the inductance thereof lowering steeply, the voltage applied across the auxiliary discharge electrode 4 and the second main discharge electrode 3 rises up steeply simultaneously with the rise-up of the voltage applied across the first and second main discharge electrodes 2 and 3, as can be seen from the waveform 2 shown in FIG. 9. As a result of this, the corona discharge takes place to preionize the space existing between the first and second main discharge electrodes 2 and 3.

Embodiment 8

Figure 12:
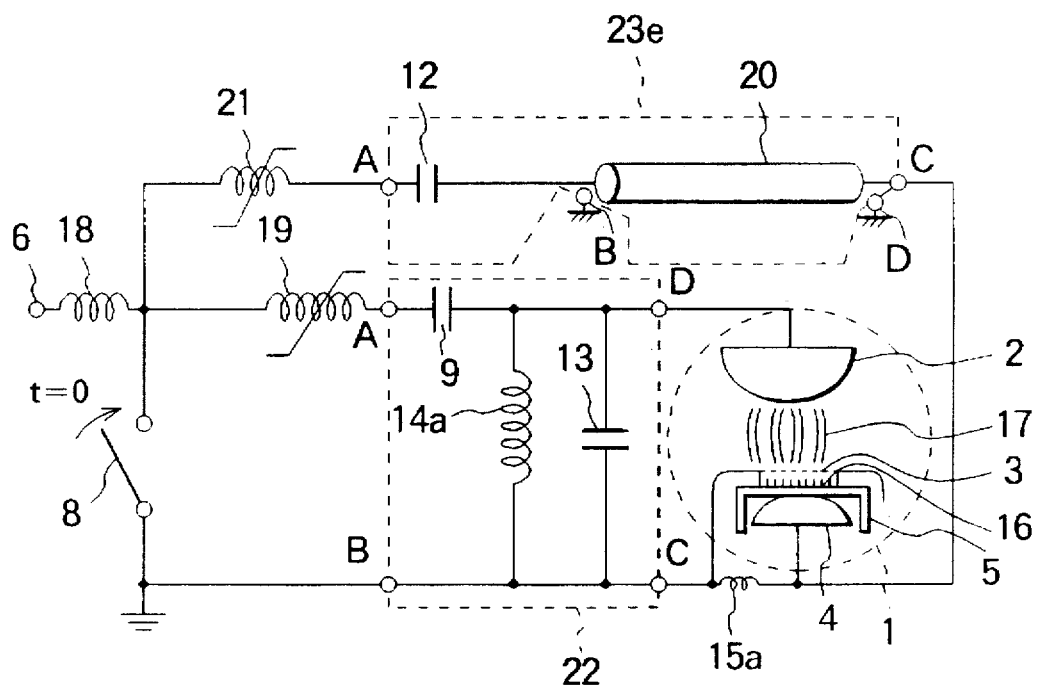
FIG. 12 is a circuit diagram showing a configuration of a discharge excitation type pulse laser apparatus according to an eighth embodiment of the present invention.

FIG. 12 is a circuit diagram showing a structure of the discharge excitation type pulse laser apparatus according to an eighth embodiment of the present invention.

The discharge excitation type pulse laser apparatus now of concern is implemented similarly to the apparatus shown in FIG. 5 (third embodiment) except for the structure of the second pulse generating four-terminal circuit. More specifically, there is inserted between the first terminal A and the third terminal C of the second pulse generating four-terminal circuit denoted by 23e a series connection of the second charging capacitor 12 and a coaxial cable 20 which serves as a delay circuit. Both ends of the coaxial cable 20 are connected to the ground potential via the second and fourth terminals B and D, respectively.

Figure 13:
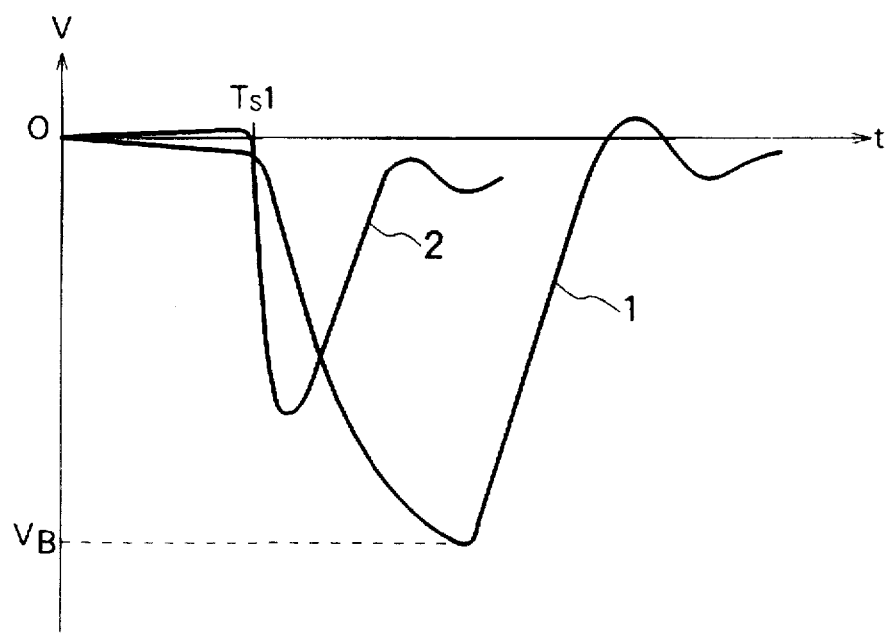
FIG. 13 is a voltage waveform diagram for illustrating operations of the discharge excitation type pulse laser apparatus shown in FIGS. 12, 14 and 15.

Next, description will turn to operation of the discharge excitation type pulse laser apparatus according to the instant embodiment by reference to FIG. 13. As mentioned previously in conjunction with the conventional pulse laser apparatus, the first and second charging capacitors 9 and 12 are first charged via the charging reactor 18. Through this charging process, the cores of the first and second saturable reactors 19 and 21 are set to the state saturated with one polarity. When the spark gap of the switching device 8 is fired at a time point t (=0), each of the first and second charging capacitors 9 and 12 starts to discharge. At this time point, the direction of the currents flowing through the first and second saturable reactors 19 and 21 is reversed relative to the direction of the currents flowing upon charging. Consequently, the cores of the first and second saturable reactors 19 and 21 become unsaturated. Thus, the first and second saturable reactors 19 and 21 function as the reactors each exhibiting a large capacity to thereby prevent the first and second charging capacitors 9 and 12 from discharging. In the meanwhile, the spark gap of the switching device 8 becomes fully conducting (i.e., the switching device 8 is closed completely in the equivalent sense) with the stray inductance and resistance components decreasing to a minimum.

At a time point t (=Ts2), the core of the second saturable reactor 21 becomes magnetically saturated, upon which inductance thereof steeply decreases nonlinearly. At this time point, however, inductance of the first saturable reactor 19 continues to be of a large value with the stray inductance and resistance components of the switching device 8 being minimized. For this reason, the second charging capacitor 12 discharges at a high rate, as a result of which the preionization by the corona discharge 16 is promoted remarkably. However, because of the presence of the coaxial cable 20 which functions as the delay circuit, the voltage making appearance between the auxiliary discharge electrode 4 and the second main discharge electrode 3 can not yet reach the level required for allowing the discharge to occur between these electrodes.

Now, when a time point t (=Ts1) is reached as the discharge process progresses, the core of the first saturable reactor 19 becomes magnetically saturated as a result of which inductance thereof steeply decreases nonlinearly, as can be seen in FIG. 13. The rise-up rate of the pulse-like voltage applied across the first and second main discharge electrodes 2 and 3 is determined by the steeply decreased value of the above-mentioned inductance, ms can be seen from the waveform 1 shown in FIG. 13. In this way, the pulse-like voltage between both the first and second main discharge electrodes 2 and 3 rises up at a high rate with the discharge start voltage (firing potential) $V_B$ being increased, which of course contributes to increasing of the energy injected into the main discharge path 17.

Further, at this time point, the voltage 12 making appearance across the second charging capacitor 12 with a time delay involved by the coaxial cable 20 is applied to the auxiliary discharge electrode 4, as a result of which the voltage between the auxiliary discharge electrode 4 and the second main discharge electrode 3 rises up steeply. Thus, the timing at which the pulse-like voltage of the waveform 2 rises up coincides with that of the pulse-like voltage of the waveform 1 between the first and second main discharge electrodes 2 and 3, whereby the unwanted phenomenon that electrons generated by the preionization under the effect of the corona discharge are absorbed by the laser gas can essentially be prevented. Thus, the transition to the primary or main discharge from the corona discharge (auxiliary discharge) can smoothly be realized.

Embodiment 9

Figure 14:
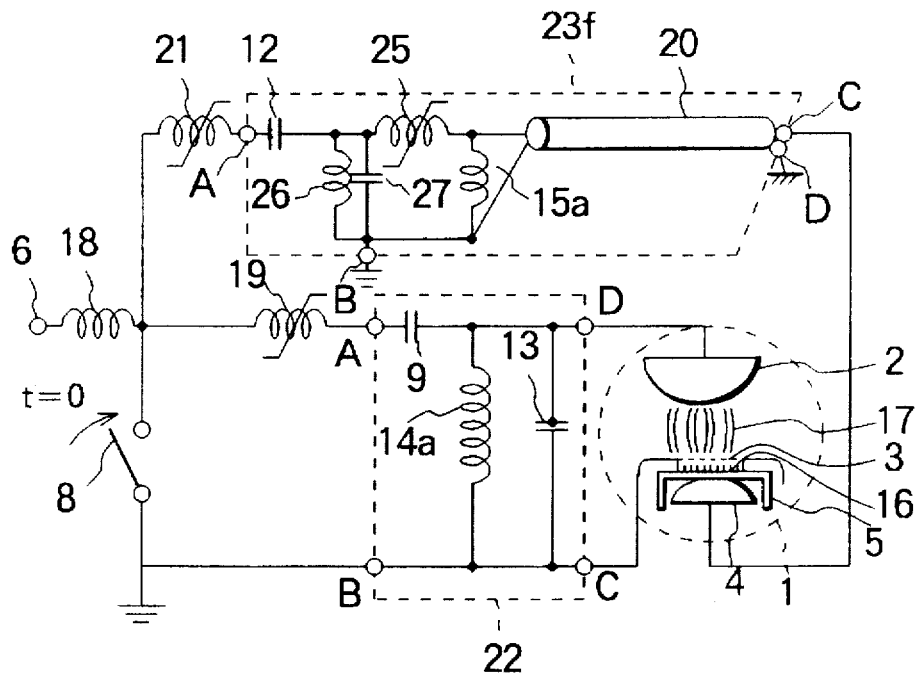
FIG. 14 is a circuit diagram showing a configuration of a discharge excitation type pulse laser apparatus according to a ninth embodiment of the present invention.

FIG. 14 is a circuit diagram showing a structure of the discharge excitation type pulse laser apparatus according to a ninth embodiment of the present invention which differs from the apparatus shown in FIG. 12 in respect to the structure of the second pulse generating four-terminal circuit which is denoted by 23f in FIG. 14. More particularly, referring to FIG. 14, connected between the first terminal A and the third terminal C of the second pulse generating four-terminal circuit 23f are a second charging capacitor 12, a third saturable reactor 25 and a coaxial cable 20 serving as a delay circuit which are serially connected in this order, wherein a charging reactor 26 and a first charge transfer capacitor 27 are connected in parallel with each other between the second terminal B and wiring conductor interconnecting the second charging capacitor 12 and the third saturable reactor 25, while the charging reactor 15a is inserted between the second terminal B and a connecting conductor which interconnects the third saturable reactor 25 and the coaxial cable 20. In this conjunction, it should however be mentioned that the charging reactor 15a may be connected between the second main discharge electrode 3 and the auxiliary discharge electrode 4 instead of connecting the charging reactor 15a in the manner mentioned above.

Next, description will turn to operation of the discharge excitation type pulse laser apparatus according to the instant embodiment by reference to the waveform diagram of FIG. 13. As mentioned previously in conjunction with the conventional pulse laser apparatus, the first and second charging capacitors 9 and 12 are first charged via the charging reactor 18. Through this charging process, the cores of the first and second saturable reactors 19 and 21 are set to the state saturated with one polarity. When the spark gap of the switching device 8 is fired at a time point t (=0), each of the first and second charging capacitors 9 and 12 starts to discharge. At that time, the currents flowing through the first and second saturable reactors 19 and 21 are reversed relative to the directions of the currents flowing through these reactors upon charging thereof. Consequently, the cores of the first and second saturable reactors 19 and 21 become unsaturated. Thus, the first and second saturable reactors 19 and 21 function as the reactors each exhibiting a large capacity to suppress the discharges of the first and second charging capacitors 9 and 12. In the meanwhile, the spark GaP of the switching device 8 becomes fully conducting (i.e., the switching device 8 is closed completely in the equivalent sense) with the stray inductance and resistance components decreasing to minimum.

At a time point t (=Ts2), the core of the second saturable reactor 21 assumes the magnetically saturated state, and thus the inductance thereof steeply decreases nonlinearly. At this time point, however, inductance of the first saturable reactor 19 continues to be of a large value with the stray inductance and resistance components of the switching device 8 being minimized. For this reason, charge transfer to the first charge transfer capacitor 27 from the second charging capacitor 12 is promoted.

Subsequently, at a time point t (=Ts3), the core of the third saturable reactor 25 becomes magnetically saturated with the inductance thereof thus abruptly decreasing nonlinearly. Because the loop for transferring the electric charge to the coaxial cable 20 by way of the third saturable reactor 25 which is now saturated has the inductance smaller than that of the loop formed by the spark gap of the switching device 8, the second saturable reactor 21, the second charging capacitor 12 and the first charge transfer capacitor 27, the voltage applied to the coaxial cable 20 rises up more steeply to thereby accelerate the preionization by the corona discharge 16. However, because of the presence of the coaxial cable 20 functioning as the delay circuit, the voltage making appearance between the auxiliary discharge electrode 4 and the second main discharge electrode 3 can not immediately increase to a sufficiently high level for the corona discharge to take place.

Now, when a time point t (=Ts1) is reached as the discharge process progresses, the core of the first saturable reactor 19 becomes magnetically saturated, as a result of which the inductance thereof steeply decreases nonlinearly, as can be seen in FIG. 13. The rise-up rate of the pulse-like voltage applied across the first and second main discharge electrodes 2 and 3 is determined by the value of the steeply decreased inductance value, as can be seen from the waveform 1 shown in FIG. 13. In this manner, the pulse-like voltage between both the first and second main discharge electrodes 2 and 3 rises up at a high rate with the discharge start voltage (firing potential) $V_B$ being increased, which of course contributes to increasing the amount of energy injected into the main discharge 17. Further, at this time point, the voltage 12 making appearance across the second charging capacitor 12 with a time delay involved by the coaxial cable 20 is applied to the auxiliary discharge electrode 4, as a result of which the voltage between the auxiliary discharge electrode 4 and the second main discharge electrode 3 rises up steeply. Thus, the timing at which the pulse-like voltage of the waveform 2 rises up coincides with that of the pulse-like voltage of the waveform 1 between the first and second main discharge electrodes 2 and 3, whereby the unwanted phenomenon that electrons generated by the preionization due to the corona discharge are absorbed by the laser gas can essentially be prevented. Thus, transition to the primary or discharge from the corona discharge (auxiliary discharge) can smoothly be realized.

Embodiment 10

Figure 15:
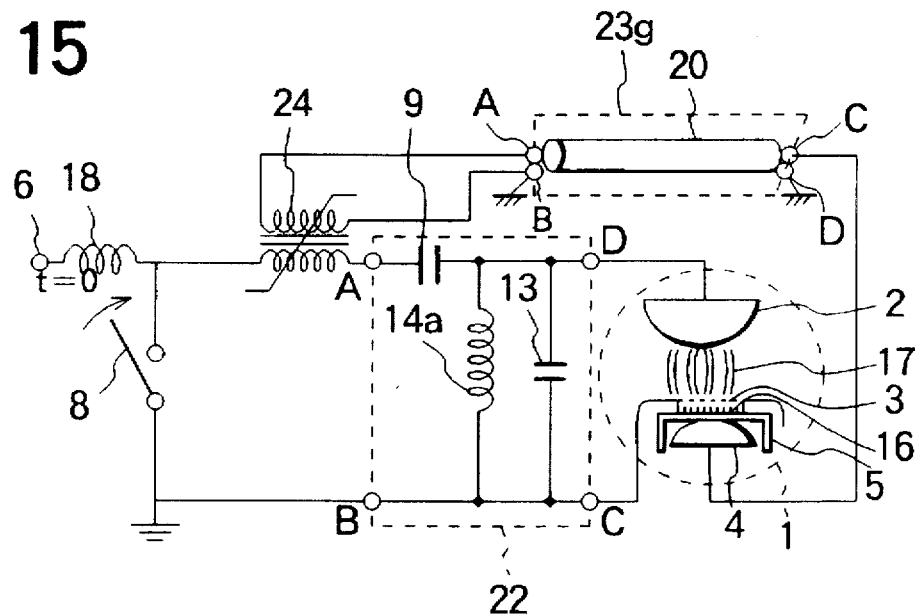
FIG. 15 is a circuit diagram showing a configuration of a discharge excitation type pulse laser apparatus according to a tenth embodiment of the present invention.

FIG. 15 is a circuit diagram showing a structure of the discharge excitation type pulse laser apparatus according to a tenth embodiment of the present invention.

The discharge excitation type pulse laser apparatus now of concern is implemented similarly to the apparatus shown in FIG. 10 (third embodiment) except for the structure of the second pulse generating four-terminal circuit which is denoted by 23g in FIG. 15. Referring to this figure, there is inserted between the first terminal A and the third terminal C of the second pulse generating four-terminal circuit 23g a coaxial cable 20 which serves as a delay circuit. Both ends of the coaxial cable 20 are connected to the second and fourth terminals B and D, respectively, both of which are is connected to the ground potential. Further, both ends of the secondary winding of the saturable transformer 24 are connected to the first terminal A and the second terminal B, respectively, of the second pulse generating four-terminal circuit 23g.

Next, operation of the discharge excitation type pulse laser apparatus according to the instant embodiment of the invention will be described by reference to FIG. 13. At first, the first charging capacitor 9 is charged by way of the charging reactor 18. Due to this charging process, the core of the saturable transformer 24 is set to the state magnetically saturated with one polarity. When the spark gap of the switching device 8 is fired at a time point t (=0), the first charging capacitor 9 starts to discharge. Since the direction of the current flowing through the saturable transformer 24 at this time point is reversed relative to the current flowing therethrough during the charging process, the core of the saturable transformer 24 is changed over to the unsaturated state. Thus, when the spark gap of the switching device 8 is closed, a voltage having a steep rise-up edge is induced in the secondary winding of the saturable transformer 24. However, because of the presence of the coaxial cable 20 functioning as the delay circuit, the voltage making appearance between the auxiliary discharge electrode 4 and the second main discharge electrode 3 can not increase sufficiently. Consequently, the corona discharge can not be generated. At this time point, inductance of the saturable transformer 24 is of a large value. As a consequence, the discharge of the first charging capacitor 9 is suppressed. In the meanwhile, the spark gap of the switching device 8 becomes fully closed (i.e., fully conducting). Thus, the stray inductance and resistance components of the switching device 8 become minimum.

Figure 19:
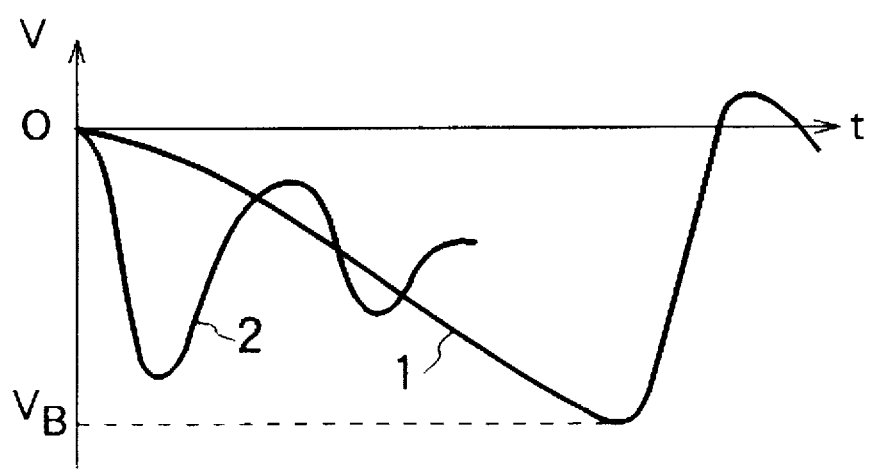
FIG. 19 is another waveform diagram for illustrating operation of the conventional discharge excitation type pulse laser apparatus shown in FIG. 17.

Now, when the time point t (=Ts1) is reached as the discharge process progresses, the core of the saturable transformer 24 becomes magnetically saturated as a result of which inductance thereof steeply decreases nonlinearly, as can be seen in FIG. 13. The rise-up rate of the pulse-like voltage applied across the first and second main discharge electrodes 2 and 3 is determined by the steeply decreased inductance value, as can be seen from the waveform 1 shown in FIG. 4. In this way, the pulse-like voltage between both the first and second main discharge electrodes 2 and 3 rises up at a high rate with the discharge start voltage (firing potential) $V_B$ increasing, which of course contribute to increasing the energy injected into the main discharge path 17, as in the case of the conventional apparatus (see FIG. 19). Further, at this time point, the voltage 12 induced across the secondary winding of the saturable transformer 24 is applied to the auxiliary discharge electrode 4 with a time delay involved by the coaxial cable 20, as a result of which the voltage between the auxiliary discharge electrode 4 and the second main discharge electrode 3 rises up steeply. Thus, the timing at which the pulse-like voltage of the waveform 2 rises up coincides with that of the pulse-like voltage of the waveform 1 making appearance between the first and second main discharge electrodes 2 and 3, whereby the unwanted phenomenon that electrons generated by the preionization due to the corona discharge are absorbed by the laser gas can essentially be prevented. Thus, transition to the primary or main discharge from the corona discharge (auxiliary discharge) can smoothly be realized.

Modifications

Many features and advantages of the present invention are apparent form the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact structures and operations illustrated and described.

By way of example, although it has been described that the coaxial line (i.e., coaxial cable 20) is employed as the pulse delay circuit, it should be understood that other pulse delay circuits such as a strip line, an LC circuitry or the like may be employed to the substantially same effects. Besides, in place of employing the spark gap switch as the switching element 8, other switching elements or circuitries such as a thyratron, semiconductor switches (e.g. thyristor, SIT transistor, FET (Field-Effect Transistor), IGBT (Insulated Gate Bipolar Transistor), etc.), serial or parallel connections thereof or a rail gap switch may be employed without departing from the spirit and scope of the invention. Furthermore, in the foregoing description of the various embodiments of the invention, it has been assumed that the charging is effected with positive (plus) polarity from the charging terminal 6, it goes without saying that the charging may be performed with negative (minus) polarity. Additionally, the charging reactors 14, 15a and 26 employed as the charging circuit components may be replaced by other component such as resistors, diodes or the like substantially to the same aimed effects. Besides, although the invention has been described as being applied to the excimer laser, it should be understood that the teachings of the invention can equally be applied to other discharge excitation type lasers. Moreover, it should be mentioned in connection with the circuits shown in FIGS. 5, 6, 8, 10, 12, 14 and 15 that the first charging capacitor 9 and the first saturable reactor 19 or the saturable transformer 24 may be replaced with each other in respect to the positions thereof, and the same holds true for the positional relation between the second charging capacitor 12 and the second saturable reactor 21.

Finally, it should be added that the electrodes mentioned previously in conjunction with the various embodiments of the invention may be implemented in such structure as shown in FIG. 16. More specifically, the second main discharge electrode 3a may be realized in a same configuration as the first main discharge electrode 2, wherein the auxiliary discharge electrode denoted by 4a in FIG. 16 may be disposed at both or one side of the second main discharge electrode 3a in such a state that the auxiliary discharge electrode 4a is peripherally enclosed with an insulation member 5a. In the case of such electrode array, the corona discharge 16 is caused to take place between the auxiliary discharge electrode 4a and the second main discharge electrode 3a to thereby ionize previously the space existing between the first and second main discharge electrodes 2 and 3a so that the corona discharge can smoothly transit to the main discharge 17.

Accordingly, all suitable modifications and equivalents may be resorted to, falling within the spirit and scope of the invention.

What is claimed is:

1. A discharge excitation type pulse laser apparatus, comprising:
   a pair of first and second main discharge electrodes disposed in opposition to each other for generating a main discharge therebetween;
   an auxiliary discharge electrode disposed in the vicinity of said second main discharge electrode for generating a corona discharge between said second main discharge electrode and said auxiliary discharge electrode;
   a first pulse generating circuit connected to said first and second main discharge electrodes for applying a pulse-like voltage for generating the main discharge between said first and second main discharge electrodes;
   a second pulse generating circuit connected to said second main discharge electrode and said auxiliary discharge electrode for applying a pulse-like voltage for generating the corona discharge between said second main discharge electrode and said auxiliary discharge electrode;
   switching means for controlling application and interruption of the voltage applied to said first and second main discharge electrodes from said first pulse generating circuit and the voltage applied to said second main discharge electrode and said auxiliary discharge electrode from said second pulse generating circuit;
   a first saturable reactor connected between said switching means and said first pulse generating circuit; and
   a second saturable reactor connected between said switching means and said second pulse generating circuit.

2. A discharge excitation type pulse laser apparatus according to claim 1,
   said first pulse generating circuit including a first charging capacitor for the main discharge which is connected in series to and between said first main discharge electrode and said first saturable reactor, and a parallel connection of a first charging circuit element and a peaking capacitor connected between said first main discharge electrode and said second main discharge electrode;
   said second pulse generating circuit including a second charging capacitor connected between said auxiliary discharge electrode and said second saturable reactor;
   said apparatus further comprising a second charging circuit element connected between said second main discharge electrode and said auxiliary discharge electrode;
   wherein said first and second charging capacitors are first charged in an opened state of said switching means, which is then followed by closing of said switching means for decreasing inductance of said second saturable reactor to thereby allow a voltage applied across said auxiliary discharge electrode and said second main discharge electrode to rise up for causing a corona discharge to take place between said auxiliary discharge electrode and said second main discharge electrode for thereby bringing about preionization in a space existing between said first main discharge electrode and said second main discharge electrode, and thereafter said switching means is closed fully to allow the inductance of said first saturable reactor to decrease so that a main discharge can take place between said first main discharge electrode and said second main discharge electrode.

3. A discharge excitation type pulse laser apparatus according to claim 2,
   wherein said second pulse generating circuit further including a delay circuit connected in series between said second charging capacitor and said auxiliary discharge electrode for causing a timing at which a pulse-like voltage applied across said auxiliary discharge electrode and said second main discharge electrode rises up to coincide substantially with a timing at which a pulse-like voltage applied across said first and second main discharge electrodes rises up.

4. A discharge excitation type pulse laser apparatus according to claim 1,
   wherein said second pulse generating circuit includes:
   a second charging capacitor inserted in series between said second saturable reactor and said auxiliary discharge electrode;
   a third saturable reactor connected between said auxiliary discharge electrode and a series connection of said second saturable reactor and said second charging capacitor;
   a third charging circuit element inserted between said auxiliary discharge electrode and said second main discharge electrode; and
   a parallel connection of a first charge transfer capacitor and a second charging circuit element, said first charge transfer capacitor having one end connected to a junction between said series connection of said second saturable reactor and said second charging capacitor and said third saturable reactor, the other end of said first charge transfer capacitor being connected to said second main discharge electrode.

5. A discharge excitation type pulse laser apparatus according to claim 4,
   wherein said second pulse generating circuit further including a delay circuit connected in series between said third saturable reactor and said auxiliary discharge electrode for causing a timing at which a pulse-like voltage applied across said auxiliary discharge electrode and said second main discharge electrode rises up to coincide substantially with a timing at which a pulse-like voltage applied across said first and second main discharge electrodes rises up.

6. A discharge excitation type pulse laser apparatus according to claim 4,
   wherein a plurality of saturable reactors are connected in series between said third saturable reactor and said auxiliary discharge electrode;
   wherein a same number of charge transfer capacitors as said plurality of saturable reactors are connected between said second main discharge electrode and a junction of said third saturable reactor and one of said plurality of saturable reactors and junctions of said plurality of saturable reactors, respectively.

7. A discharge excitation type pulse laser apparatus according to claim 1,
   wherein said auxiliary discharge electrode is implemented in a rod-like configuration coated with an insulation material and disposed at least at one side of said second main discharge electrode in the vicinity thereof and in opposition thereto.

8. A discharge excitation type pulse laser apparatus, comprising:
   a pair of first and second main discharge electrodes disposed in opposition to each other for generating a main discharge therebetween;
   an auxiliary discharge electrode disposed in the vicinity of said second main discharge electrode for generating a corona discharge between said second main discharge electrode and said auxiliary discharge electrode;

a first pulse generating circuit connected to said first and second main discharge electrodes for applying a pulse-like voltage for generating the main discharge between said first and second main discharge electrodes;

a second pulse generating circuit connected to said second main discharge electrode and said auxiliary discharge electrode for applying a pulse-like voltage for generating the corona discharge between said second main discharge electrode and said auxiliary discharge electrode;

switching means for controlling application and interruption of the voltage applied to said first and second main discharge electrodes from said first pulse generating circuit and the voltage applied to said second main discharge electrode and said auxiliary discharge electrode from said second pulse generating circuit; and a saturable transformer inserted between said switching means and said first and second pulse generating circuits and having a primary winding connected between said switching means and said first pulse generating circuit and a secondary winding connected to said second pulse generating circuit.

9. A discharge excitation type pulse laser apparatus according to claim 8, said first pulse generating circuit including a first charging capacitor connected in series between said first main discharge electrode and a primary winding of said saturable transformer and a parallel connection of a first charging circuit element and a peaking capacitor connected between said first main discharge electrode and said second main discharge electrode;

said second pulse generating circuit including a connecting conductor inserted between said auxiliary discharge electrode and said saturable transformer;

wherein after charging said first charging capacitor in an opened state of said switching means, said switching means is closed to allow a corona discharge to take place at first between said auxiliary discharge electrode and said second main discharge electrode for thereby bringing about preionization in a space existing between said first and second main discharge electrodes, and thereafter said switching means is closed fully to allow the inductance of said saturable transformer to decrease so that a main discharge can take place between said first and second main discharge electrodes.

10. A discharge excitation type pulse laser apparatus according to claim 8, said first pulse generating circuit including a first charging capacitor connected in series between said first main discharge electrode and a primary winding of said saturable transformer, and a first charging circuit element connected between said first and second main discharge electrodes;

said second pulse generating circuit including a delay circuit connected in series between said auxiliary discharge electrode and a secondary winding of said saturable transformer for causing a timing at which a pulse-like voltage applied across said auxiliary discharge electrode and said second main discharge electrode rises up to coincide substantially with a timing at which a pulse-like voltage applied across said first and second main discharge electrodes rises up.

11. A discharge excitation type pulse laser apparatus, comprising:

a pair of first and second main discharge electrodes disposed in opposition to each other for generating a main discharge therebetween;

an auxiliary discharge electrode disposed in the vicinity of said second main discharge electrode for generating a corona discharge between said second main discharge electrode and said auxiliary discharge electrode;

a first pulse generating circuit connected to said first and second main discharge electrodes for applying a pulse-like voltage for the main discharge between said first and second main discharge electrodes;

a second pulse generating circuit connected to said second main discharge electrode and said auxiliary discharge electrode for applying a pulse-like voltage for generating the corona discharge between said second main discharge electrode and said auxiliary discharge electrode;

switching pulse generating means for controlling application and interruption of a voltage applied to said first and second main discharge electrodes from said first pulse generating circuit and a voltage applied to said second main discharge electrode and said auxiliary discharge electrode from said second pulse generating circuit;

a saturable transformer connected between said pulse generating means and said first and second pulse generating circuits; and a first charging capacitor connected across both ends of said switching pulse generating means.

12. A discharge excitation type pulse laser apparatus according to claim 11, said first pulse generating circuit including a peaking capacitor having one end connected to a junction between the primary winding of said saturable transformer and said first main discharge electrode, the other end of said peaking capacitor being connected to a junction between said switching pulse generating means and said second main discharge electrode;

said second pulse generating circuit including a second charging capacitor connected between both ends of a secondary winding of said saturable transformer and a saturable reactor connected between said secondary winding of said saturable transformer and said auxiliary discharge electrode;

said apparatus further comprising a charging circuit element connected between said second main discharge electrode and said auxiliary discharge electrode;

wherein after charging said second charging capacitor by way of said first charging capacitor and said saturable transformer in response to a switching pulse-like voltage supplied from said switching pulse generating means, inductance of said saturable transformer and inductance of said saturable reactor are decreased to allow a voltage to rise up between said auxiliary discharge electrode and said second main discharge electrode, while allowing a voltage to rise up between said first main discharge electrode and said second main discharge electrode.

* * * * *